(12) United States Patent
Khan et al.

(10) Patent No.: US 11,501,580 B1
(45) Date of Patent: Nov. 15, 2022

(54) METHODS AND SYSTEMS FOR IMPLEMENTING SECURE BIOMETRIC RECOGNITION

(71) Applicant: King Saud University, Riyadh (SA)

(72) Inventors: Muhammad Khurram Khan, Riyadh (SA); Tengfei Wu, Nanchang (CN); Leng Lu, Nanchang (CN)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 17/708,692

(22) Filed: Mar. 30, 2022

(51) Int. Cl.
| | |
|---|---|
| *G06K 9/36* | (2006.01) |
| *G06K 9/62* | (2022.01) |
| *G06V 40/50* | (2022.01) |
| *H04L 9/06* | (2006.01) |
| *G06V 40/12* | (2022.01) |
| *G06V 10/82* | (2022.01) |
| *G06V 40/13* | (2022.01) |
| *G06V 10/143* | (2022.01) |

(52) U.S. Cl.
CPC .......... *G06V 40/53* (2022.01); *G06V 10/143* (2022.01); *G06V 10/82* (2022.01); *G06V 40/1318* (2022.01); *G06V 40/1347* (2022.01); *G06V 40/1365* (2022.01); *H04L 9/0643* (2013.01)

(58) Field of Classification Search
CPC ..... H04L 9/3231; H04L 9/0643; G06V 10/82; G06V 40/53; G06V 40/12–40/1394; G06V 10/143
See application file for complete search history.

(56) References Cited

FOREIGN PATENT DOCUMENTS

| CN | 101093626 B | 12/2007 |
|---|---|---|
| CN | 100593790 C | 11/2008 |

OTHER PUBLICATIONS

V. Sujitha, and D. Chitra. "A Novel Technique for Multi Biometric Cryptosystem Using Fuzzy Vault." Journal of medical systems, vol. 43, No. 5, pp. 1-9, May 2019.
T. Wu, L. Leng, M.K. Khan, and F.A.Khan, "Palmprint-Palmvein Fusion Recognition Based on Deep Hashing Network," IEEE Access, vol. 9, pp. 135816-135827, Sep. 2021.
M. Jaderberg, K. Simonyan, A. Zisserman, and K. Kavukcuoglu, "Spatial transformer networks," arXiv preprint arXiv:1506.02025, Jun 5. 2015.

(Continued)

*Primary Examiner* — Brian Werner

(57) ABSTRACT

The present disclosure provides a method for facilitating implementing biometric recognition. Further, the method may include receiving two or more biometric images of one or more biometric identifiers of one or more individuals from one or more devices. Further, the two or more biometric images may be in two or more spectrums. Further, the method may include analyzing the two or more biometric images using one or more deep hashing network models. Further, the method may include extracting two or more discriminative deep hashing codes from the two or more biometric images based on the analyzing. Further, the method may include generating a biometric template based on the two or more discriminative deep hashing codes. Further, the method may include generating a biometric key for the one or more biometric identifiers using a fuzzy commitment scheme based on the biometric template. Further, the method may include storing the biometric key.

20 Claims, 24 Drawing Sheets

(56) References Cited

OTHER PUBLICATIONS

D. Zhong, S. Liu, W. Wang and X. Du, "Palm vein recognition with deep hashing network." in Chinese Conference on Pattern Recognition and Computer Vision (PRCV) Springer, Cham, 2018, pp. 38-49.

PolyU Palmprint Database (Version 2.0). <URL: https://www.comp.polyu.edu.hk/—biometrics.>

Tongji palmprint image Retrieved from Internet <URL:https://cslinzhang.github.io/ContactlessPalm/.>

L. Zhang, Z. Cheng, Y. Shen, and D. Wang, "Palmprint and palmvein recognition based on DCNN and a new large-scale contactless palmvein dataset," Symmetry, vol. 10, No. 4, pp. 78, Apr. 2018.

K Nandakumar, AK Jain, Biometric template protection: Bridging the performance gap between theory and practice—IEEE Signal Processing Magazine,2015.

S Dobbie, Challenge of biometric security for banks, Biometric Technology Today, 2020—Elsevier, vol. 2020, Issue 3, Mar. 2020, pp. 5-7.

M Gomez-Barrero, J Galbally, General framework to evaluate unlinkability in biometric template protection systems, IEEE Transactions on, 2017.

Wencheng Yang, Song Wang, Jiankun Hu, Ahmed Ibrahim, Guanglou Zheng, Marcelo Jose Macedo, Michael N. Johnstone and Craig Valli Sensors, A Cancelable Iris- and Steganography-Based User Authentication System for the Internet of Things, 2019, 19(13), 2985.

Peng, J., Yang, B., Gupta, B.B. et al. A biometric cryptosystem scheme based on random projection and neural network. Soft Comput 25, 7657-7670 (2021).

V. M. Patel, N. K. Ratha and R. Chellappa, "Cancelable Biometrics: A review," in IEEE Signal Processing Magazine, vol. 32, No. 5, pp. 54-65, Sep. 2015.

YL Lai, JY Hwang, Z Jin, S Kim, S Cho, Symmetric keyring encryption scheme for biometric cryptosystem, ABJ Teoh—Information Sciences, 2019.

Lian Wu, Yong Xu, Zhongwei Cui, Yu Zuo, Shuping Zhao and Lunke Fei, Triple-Type Feature Extraction for Palmprint Recognition, Sensors 2021, 21(14), 4896.

Kunlei Jing, Xinman Zhang and Guokun Song, Correntropy-Induced Discriminative Nonnegative Sparse Coding for Robust Palmprint Recognition, Sensors 2020, 20(15), 4250.

L Fei, G Lu, W Jia, S Teng, Feature extraction methods for palmprint recognition: A survey and evaluation, IEEE Transactions, 2018.

D Zhong, X Du, K Zhong, Decade progress of palmprint recognition: A brief survey, Neurocomputing, 2019—Elsevier.

L. Leng, J. Zhang, M. K. Khan, X. Chen and K. Alghathbar, "Dynamic weighted discrimination power analysis: a novel approach for face and palmprint recognition in DCT domain," International Journal of Theoretical Physics, vol. 5, No. 17, pp. 2543-2554, Dec. 2020.

L. Leng, M. Li, C. Kim and X. Bi, "Dual-source discrimination power analysis for multi-instance contactless palmprint recognition," Multimedia Tools and Applications, vol. 76, pp. 333-354, Jan. 2017.

Z. Yang, L. Leng and W. Min, "Extreme downsampling and joint feature for coding-based palmprint recognition," IEEE Transactions on Instrumentation and Measurement, vol. 70, pp. 1-12, Jan. 2021.

L. Leng, Z. Yang and W. Min, "Democratic voting downsampling for coding-based palmprint recognition," IET Biometrics, vol. 9, No. 6, pp. 290-296, Nov. 2020.

S. Zhao, and Bob Zhang, "Deep discriminative representation for generic palmprint recognition," Pattern Recognition, vol. 98 pp. 107071, Feb. 2020.

J. H. Kim, B. G. Kim, P. P. Roy and D. M. Jeong, "Efficient facial expression recognition algorithm based on hierarchical deep neural network structure," IEEE Access, vol. 7, pp. 41273-41285, Mar. 2019.

A. S. Tarawneh, D. Chetverikov and A. B. Hassanat, "Pilot comparative study of different deep features for palmprint identification in low-quality images," arXiv preprint arXiv:1804.04602, 2018.

A. Krizhevsky, I. Sutskever, and G. E. Hinton, "ImageNet classification with deep convolutional neural networks," 25th International Conference on Neural Information Processing Systems (NIPS), pp. 1097-1105, 2012.

K. Simonyan, and A. Zisserman, "Very deep convolutional networks for large-scale image recognition," arXiv preprint arXiv:1409.1556, 2014.

R. Ramachandra, X. B. Raja, S. Venkatesh, S. Hegde, S. D. Dandappanavar, and C. Busch, "Verifying the newborns without infection risks using contactless palmprints," International Conference on Biometrics (ICB), pp. 209-216, 2018.

J. Svoboda, J. Masci, and M. M. Bronstein, "Palmprint recognition via discriminative index learning," in 23rd International Conference on Pattern Recognition (ICPR), pp. 4232-4237, 2016.

Y. Wen, K. Zhang, Z. Li, and Y. Qiao, "A discriminative feature learning approach for deep face recognition," in European conference on computer vision, Amsterdam, the Netherlands, pp. 499-515, Oct. 2016.

D. Zhong, and J. Zhu, "Centralized large margin cosine loss for open-set deep palmprint recognition," IEEE Transactions on Circuits and Systems for Video Technology, vol. 30, No. 6, pp. 1559-1568, Mar. 2019.

D. Palma, P. L. Montessoro, G. Giordano, and F. Blanchini, "Biometricpalmprint verification: A dynamical system approach," IEEE Transactions on Systems, Man, and Cybernetics: Systems, vol. 49, No. 12, pp. 2676-2687, Dec. 2019.

W. M. Matkowski, T. Chai, and A. W. K. Kong, "Palmprint recognition in uncontrolled and uncooperative environment," EEE Transactions on Information Forensics and Security, vol. 15, pp. 1601-1615, Oct. 2019.

T. Chai, S. Prasad, and S. Wang, "Boosting palmprint identification with gender information using DeepNet," Future Generation Computer Systems, vol. 99, pp. 41-53, Oct. 2019.

X. Du, D. Zhong, and H. Shao, "Cross-domain palmprint recognition via regularized adversarial domain adaptive hashing," IEEE Transactions on Circuits and Systems for Video Technology, Sep. 2020.

Y. Liu, and A. Kumar, "Contactless palmprint identification using deeply learned residual features," IEEE Transactions on Biometrics, Behavior, and Identity Science, vol. 2, No. 2, pp. 172-181, Jan. 2020.

S. Minaee, and Y. Wang, "Palmprint recognition using deep scattering network," IEEE International Symposium on Circuits and Systems (ISCAS), pp. 1-4, May 2017.

A. Genovese, V. Piuri, K. N. Plataniotis, and F. Scotti, "PalmNet: Gabor-PCA convolutional networks for touchless palmprint recognition," IEEE Transactions on Information Forensics and Security, vol. 14, No. 12, pp. 3160-3174, Dec. 2019.

Y. C. Chen, M. H. Lim, P. C. Yuen, and J. H. Lai, "Discriminant spectral hashing for compact palmprint representation," in Chinese Conference on Biometric Recognition, pp. 225-232, Nov. 2013.

J. Cheng, Q. Sun, J. Zhang, and Q. Zhang, "Supervised hashing with deep convolutional features for palmprint recognition," in Proceeding 12th Chinese Conference on Biometric Recognition, pp. 259-268, Oct. 2017.

D. Zhong, H. Shao, and X. Du, "A hand-based multi-biometrics via deep hashing network and biometric graph matching," IEEE Transactions on Information Forensics and Security, vol. 14, No. 12, pp. 3140-3150, 2019.

D. Zhong, S. Liu, W. Wang, and X. Du, "Palm vein recognition with deep hashing network," in Chinese Conference on Pattern Recognition and Computer Vision (PRCV) Springer, Cham, pp. 38-49, 2018.

D. Li, Y. Gong, D. Cheng, W. Shi, X. Tao, and X. Chang, "Consistency-Preserving deep hashing for fast person re-identification," Pattern Recognition, vol. 94, pp. 207-217, Oct. 2019.

Y. Liu, J. Song. K. Zhou, L. Yan, L. Liu, F. Zou, and L. Shao, "Deep self-taught hashing for image retrieval," IEEE Transactions on Cybernetics, vol. 49, No. 6, pp. 2229-2241, May 2018.

(56) References Cited

OTHER PUBLICATIONS

U. Uludag, S. Pankanti, S. Prabhakar, and A.K. Jain, "Biometric cryptosystems: issues and challenges," Proceedings of the IEEE, vol. 92, No. 6, pp. 948-960, May 2004.

Y. Dodis, R. Ostrovsky, L. Reyzin, and A. Smith, "Fuzzy extractors: how to generate strong keys from biometrics and other noisy data," SIAM Journal on Computing, vol. 38, No. 1, pp. 97-139, 2008.

A. Juels, and M. Wattenberg, "A fuzzy commitment scheme," in: Proceedings of 6th ACM Conference on Computer and Communications Security, pp. 28-36, Nov. 1999.

A. Juels, and M. Sudan, "A fuzzy vault scheme," Designs, Codes and Cryptography, vol. 38, No. 2, pp. 237-257, Feb. 2006.

X.Q. Wu, D. Zhang, and K.Q. Wang, "A palmprint cryptosystem," in: Proceedings of the International Conference on Advances in Biometrics, pp. 27-29, Aug. 2007.

X.Q. Wu, D. Zhang, and K.Q. Wang, "A cryptosystem based on palmprint feature," in Proceedings of the 19th International Conference on Pattern Recognition, pp. 1-4, Dec. 2008.

L. Leng, and J.S. Zhang. "Dual-key-binding cancelable palmprint cryptosystem for palmprint protection and information security." Journal of Network and Computer Applications, vol. 34, No. 6, pp. 1979-1989, Nov. 2012.

A. Kumar, and A. Kumar, "Development of a new cryptographic construct using palmprint-based fuzzy vault," EURASIP Journal on Advances in Signal Processing, pp. 1-11, Dec. 2009.

O.P. Verma, and D. Bharathan, "A new palm print based fuzzy vault system for securing cryptographic key," International Journal of Information and Electronics Engineering, vol. 2 No. 2, pp. 289-292, Mar. 2012.

H.L. Liu, D.M. Sun, K. Xiong, and Z.D. Qiu, "Palmprint based multidimensional fuzzy vault scheme," The Scientific World Journal, Article ID 819031, pp. 1-8, Jan. 2014.

L. Leng, and A.B.J. Teoh. "Alignment-free row-co-occurrence cancelable palmprint fuzzy vault." Pattern Recognition, vol. 48, No. 7, pp. 2290-2303, Jul. 2015.

L. Leng, and J.S. Zhang. "Palmhash code vs. palmphasor code." Neurocomputing, vol. 108, pp. 1-12, May 2013.

V. Sujitha, and D. Chitra. "Highly secure palmprint based biometric template using fuzzy vault." Concurrency and Computation: Practice and Experience 31, No. 12, pp. e4513, Jun. 2019.

1300

| Type | Configuration | Output size (C×H×W) |
|---|---|---|
| Input | | 1×128×128 |
| STN | | 1×128×128 |
| Conv1 | 16×3×3, st.4, pad 0, BN, PReLU | 16×32×32 |
| Max_pool | 2×2, st.1, pad 0 | 16×31×31 |
| Conv2 | 32×5×5, st.2, pad 2, BN, PReLU | 32×16×16 |
| Max_pool | 2×2, st.1, pad 0 | 32×15×15 |
| Conv3 | 64×3×3, st.1, pad 1, PReLU | 64×15×15 |
| Conv4 | 64×3×3, st.1, pad 1, PReLU | 64×15×15 |
| Conv5 | 128×3×3, st.1, pad 1, PReLU | 128×15×15 |
| Max_pool | 2×2, st.1, pad 0 | 128×14×14 |
| Full6 | 2048 | 2048 |
| Full7 | 2048 | 2048 |
| Full8 | 64/128/256 tanh and sgn | 64/128/256 |

| Database | | Acquisition | Class number | Sample number / class | Total sample number |
|---|---|---|---|---|---|
| PolyU | [8] | Contact | 378 | 20 | 7560 |
| Red | [8] | Contact | 500 | 12 | 6000 |
| Green | [8] | Contact | 500 | 12 | 6000 |
| Blue | [8] | Contact | 500 | 12 | 6000 |
| NIR | [8] | Contact | 500 | 12 | 6000 |
| Tongji Palmprint | [9] | Contactless | 600 | 20 | 12000 |
| Tongji Palmvein | [9] | Contactless | 600 | 20 | 12000 |

| Dataset/Spectrum | 128bit | 64bit |
|---|---|---|
| PolyU | 0.4566 | 1.060 |
| Tongji | 0.3991 | 1.5181 |
| Tongji vein | 0.7265 | 1.9472 |
| B | 0.1320 | 0.5970 |
| G | 0.1960 | 0.4410 |
| N | 0.0601 | 0.2864 |
| R | 0.1297 | 0.4277 |
| B+N | 0.0198 | 0.0936 |
| B+G | 0.0583 | 0.1264 |
| B+R | 0.0213 | 0.0799 |
| G+N | 0.0135 | 0.0782 |
| G+R | 0.0294 | 0.0387 |
| N+R | 0.0096 | 0.0613 |
| B+G+R | 0.0260 | 0.0492 |
| B+G+N | 0.0016 | 0.0657 |
| B+N+R | 0.0013 | 0.0550 |
| G+N+R | 0.0023 | 0.0248 |
| G+R+N+B | 0.0013 | 0.0253 |

FIG. 17

| Dataset | 128 bits (Original) | Lowest EER (Bit number) | 64 bits (Original) | 64 bits selected from 128 bits |
|---|---|---|---|---|
| PolyU | 0.4566 | 0.4179(124) | 1.0599 | 0.7956 |
| Tongji | 0.3991 | 0.3795(124) | 1.5180 | 0.9284 |
| Tongji vein | 0.7265 | 0.6752(127) | 1.9470 | 1.3189 |
| B | 0.1338 | 0.1263(118) | 0.5970 | 0.3706 |
| G | 0.1959 | 0.1950(115) | 0.4410 | 0.5020 |
| R | 0.1297 | 0.1026(124) | 0.4277 | 0.3010 |
| N | 0.0601 | 0.0543(95) | 0.2864 | 0.1654 |

FIG. 18

| 2 templates concatenation | 256 bits (Original) | Lowest EER (Bit number) | 128 bits selected from 256 bits |
|---|---|---|---|
| B+N | 0.0027 | 0.0017(254) | 0.0436 |
| B+G | 0.0689 | 0.0574(168) | 0.1401 |
| B+R | 0.0365 | 0.0260(199) | 0.0920 |
| G+N | 0.0124 | 0.0118(155) | 0.0426 |
| G+R | 0.0273 | 0.0200(202) | 0.1162 |
| N+R | 0.0135 | 0.0022(234) | 0.0573 |
| 3 templates concatenation | 384 bits (Original) | Lowest EER (Bit number) | 128 bits selected from 384 bits |
| B+G+R | 0.0376 | 0.0174(293) | 0.1350 |
| B+G+N | 0.0023 | 0.0020(374) | 0.0589 |
| B+N+R | 0.0006 | 0.0001(292) | 0.0421 |
| G+N+R | 0.0021 | 0.0011(344) | 0.0298 |
| 4 templates concatenation | 512 bits (Original) | Lowest EER (Bit number) | 128 bits selected from 512 bits |
| G+R+N+B | 0.0017 | 0.0004(411) | 0.0518 |

FIG. 20

| Dataset | Template length ($L$) | Code length ($n$) | Message length ($k$) | Number of correctable errors($t$)/ Threshold ($\tau_{max}$) | FAR(%) | FRR(%) |
|---|---|---|---|---|---|---|
| PolyU | Original 128 | 511 | 202 | 42 | 0.4430 | 0.4703 |
| | Selected 124 | 511 | 211 | 41 | 0.5243 | 0.4174 |
| | Original 64 | 255 | 115 | 21 | 1.4865 | 0.9230 |
| | Selected 64 | 255 | 115 | 21 | 1.5859 | 0.5232 |
| Tongji | Original 128 | 511 | 184 | 45 | 0.6261 | 0.3111 |
| | Selected 124 | 511 | 202 | 42 | 0.3405 | 0.4185 |
| | Original 64 | 255 | 107 | 22 | 1.7954 | 1.2407 |
| | Selected 64 | 255 | 115 | 21 | 1.1198 | 0.7370 |
| Tongji vein | Original 128 | 511 | 184 | 45 | 0.7826 | 0.6704 |
| | Selected 127 | 511 | 184 | 45 | 0.8879 | 0.6407 |
| | Original 64 | 255 | 115 | 21 | 1.1526 | 1.4852 |
| | Selected 64 | 255 | 107 | 22 | 2.1867 | 1.7074 |
| G | Original 128 | 511 | 202 | 42 | 0.2052 | 0.1867 |
| | Selected 115 | 511 | 238 | 37 | 0.1901 | 0.2000 |
| | Original 64 | 255 | 115 | 21 | 0.7743 | 0.3600 |
| | Selected 64 | 255 | 115 | 21 | 0.6306 | 0.3733 |
| B | Original 128 | 511 | 211 | 41 | 0.1210 | 0.1467 |
| | Selected 118 | 511 | 229 | 38 | 0.1592 | 0.0933 |
| | Original 64 | 255 | 115 | 21 | 0.8411 | 0.5067 |
| | Selected 64 | 255 | 123 | 19 | 0.3013 | 0.4400 |
| N | Original 128 | 511 | 211 | 41 | 0.0535 | 0.0667 |
| | Selected 95 | 511 | 277 | 28 | 0.0353 | 0.0533 |
| | Original 64 | 255 | 115 | 21 | 0.6529 | 0.1867 |
| | Selected 64 | 255 | 131 | 18 | 0.1442 | 0.1867 |
| R | Original 128 | 511 | 211 | 41 | 0.1127 | 0.1467 |
| | Selected 124 | 511 | 220 | 39 | 0.0852 | 0.1200 |
| | Original 64 | 255 | 115 | 21 | 0.7479 | 0.3333 |
| | Selected 64 | 255 | 123 | 19 | 0.3353 | 0.2667 |

| Dataset | Template length (L) | Code length (n) | Message length (k) | Number of correctable errors/ Threshold (τ) | FAR(%) | FRR(%) |
|---|---|---|---|---|---|---|
| B+N | Original 256 | 1023 | 368 | 85 | 0.0084 | 0 |
| | Selected 254(Lowest EER) | 1023 | 383 | 82 | 0.0033 | 0 |
| | Selected 128 | 511 | 211 | 41 | 0.0472 | 0.0400 |
| B+G | Original 256 | 1023 | 358 | 86 | 0.0712 | 0.0667 |
| | Selected 168(Lowest EER) | 1023 | 533 | 54 | 0.0615 | 0.0533 |
| | Selected 128 | 511 | 211 | 41 | 0.1203 | 0.1600 |
| B+R | Original 256 | 1023 | 358 | 86 | 0.0330 | 0.0400 |
| | Selected 199(Lowest EER) | 1023 | 443 | 73 | 0.4221 | 0 |
| | Selected 128 | 511 | 211 | 41 | 0.1039 | 0.0800 |
| G+N | Original 256 | 1023 | 368 | 85 | 0.0114 | 0.0133 |
| | Selected 155(Lowest EER) | 511 | 157 | 51 | 0.0409 | 0.0133 |
| | Selected 128 | 511 | 211 | 41 | 0.0451 | 0.0400 |
| G+R | Original 256 | 1023 | 368 | 85 | 0.0280 | 0.0267 |
| | Selected 202(Lowest EER) | 1023 | 443 | 73 | 0.3239 | 0 |
| | Selected 128 | 511 | 211 | 41 | 0.1124 | 0.1300 |
| N+R | Original 256 | 1023 | 368 | 85 | 0.0192 | 0 |
| | Selected 234(Lowest EER) | 1023 | 443 | 73 | 0.0045 | 0 |
| | Selected 128 | 511 | 211 | 41 | 0.0770 | 0.0533 |
| B+G+R | Original 384 | 2047 | 815 | 146 | 0.3979 | 0 |
| | Selected 293(Lowest EER) | 2047 | 1090 | 99 | 0.0430 | 0.0133 |
| | Selected 128 | 511 | 211 | 41 | 0.1234 | 0.1467 |
| B+G+N | Original 384 | 2047 | 837 | 126 | 0.0046 | 0 |
| | Selected 374(Lowest EER) | 2047 | 881 | 122 | 0.0039 | 0 |
| | Selected 128 | 511 | 211 | 41 | 0.0511 | 0.0667 |
| B+N+R | Original 384 | 2047 | 848 | 125 | 0.0013 | 0 |
| | Selected 292(Lowest EER) | 1023 | 338 | 89 | 0.0002 | 0 |
| | Selected 128 | 511 | 211 | 41 | 0.0495 | 0.0267 |
| G+N+R | Original 384 | 2047 | 826 | 127 | 0.0043 | 0 |
| | Selected 344(Lowest EER) | 2047 | 980 | 110 | 0.0023 | 0 |
| | Selected 128 | 511 | 211 | 41 | 0.0462 | 0.0133 |
| G+R+N+B | Original 512 | 2047 | 639 | 171 | 0.0035 | 0 |
| | Selected 411(Lowest EER) | 2047 | 815 | 146 | 0.0257 | 0 |
| | Selected 128 | 511 | 202 | 42 | 0.0502 | 0.0533 |

FIG. 22

|  | [4] | [14] | [11] | [13] | [12] | [current invention] |
| --- | --- | --- | --- | --- | --- | --- |
| Feature representation | Binary code | Minutiae | Binary code | Binary code | Binary code | Binary code |
| Template size | 1024 bits | 715 points | 1024bits | 2048bits | 4096bits | 128bits |
| Shift matching | Yes | No | Yes | Yes | Yes | No |

FIG. 23

METHODS AND SYSTEMS FOR IMPLEMENTING SECURE BIOMETRIC RECOGNITION

FIELD OF THE INVENTION

The present disclosure generally relates to a field of data processing. More specifically, the present disclosure relates to methods and systems for implementing secure biometric recognition.

BACKGROUND OF THE INVENTION

Although biometric recognition has been widely used in many important applications, it suffers from various attacks that degrade its security and privacy. Therefore, biometric template protection methods, such as cancelable biometric and biometric cryptosystem, are essential to avoid direct disclosure of original biometric features.

Cancelable biometric transforms the original biometric feature to its protected version with specific functions. Although the specific functions can be non-invertible, i.e., the original biometric feature cannot be exactly reconstructed, some relationships between the original biometric feature and its protected version are still available. Thus, privacy is not strictly protected.

Biometric cryptosystem attempts to utilize biometric features as authenticators for cryptographic applications, which replace conventional credentials, such as passwords, tokens. A biometric key can be exactly generated and then strictly protected with a one-way function. However, it is highly difficult to balance the template size and accuracy. Typically, the computational complexity of biometric cryptosystems is much higher than that of common biometric recognition systems, which hinders its development and applications. Thus, the features with low size and high accuracy are significant in biometric cryptosystems. Direct usage of original biometric features/templates leads to serious privacy leakage. In biometric cryptosystems, a biometric key is generated and then strictly protected with a one-way function. However, it is highly difficult to balance the template size and accuracy.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method for facilitating implementing biometric recognition. Further, the method may include receiving, using a communication device, two or more biometric images of one or more biometric identifiers of one or more individuals from one or more devices. Further, the two or more biometric images may be in two or more spectrums. Further, the method may include analyzing, using a processing device, the two or more biometric images using one or more deep hashing network models. Further, the method may include extracting, using the processing device, two or more discriminative deep hashing codes from the two or more biometric images based on the analyzing. Further, the method may include generating, using the processing device, a biometric template based on the two or more discriminative deep hashing codes. Further, the method may include generating, using the processing device, a biometric key for the one or more biometric identifiers using a fuzzy commitment scheme based on the biometric template. Further, the method may include storing, using a storage device, the biometric key.

The present disclosure provides a system for facilitating implementing biometric recognition. Further, the system may include a communication device which may be configured for receiving two or more biometric images of one or more biometric identifiers of one or more individuals from one or more devices. Further, the two or more biometric images may be in two or more spectrums. Further, the system may include a processing device communicatively coupled with the communication device. Further, the processing device may be configured for analyzing the two or more biometric images using one or more deep hashing network models. Further, the processing device may be configured for extracting two or more discriminative deep hashing codes from the two or more biometric images based on the analyzing. Further, the processing device may be configured for generating a biometric template based on the two or more discriminative deep hashing codes. Further, the processing device may be configured for generating a biometric key for the one or more biometric identifiers using a fuzzy commitment scheme based on the biometric template. Further, the system may include a storage device communicatively coupled with the processing device. Further, the storage device may be configured for storing the biometric key.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

Figure 4:
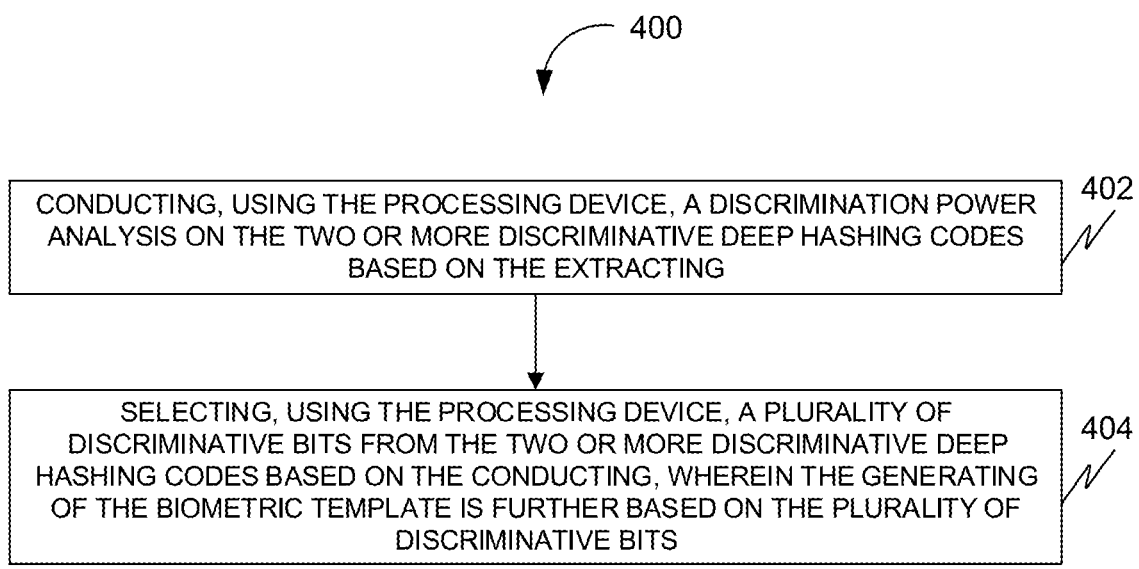

FIG. 4 illustrates a flowchart of the method for facilitating implementing biometric recognition including selecting, using a processing device, a plurality of discriminative bits from the two or more discriminative deep hashing codes based on the conducting, wherein the generating of the biometric template is further based on the plurality of discriminative bits, in accordance with some embodiments.

Figure 5:
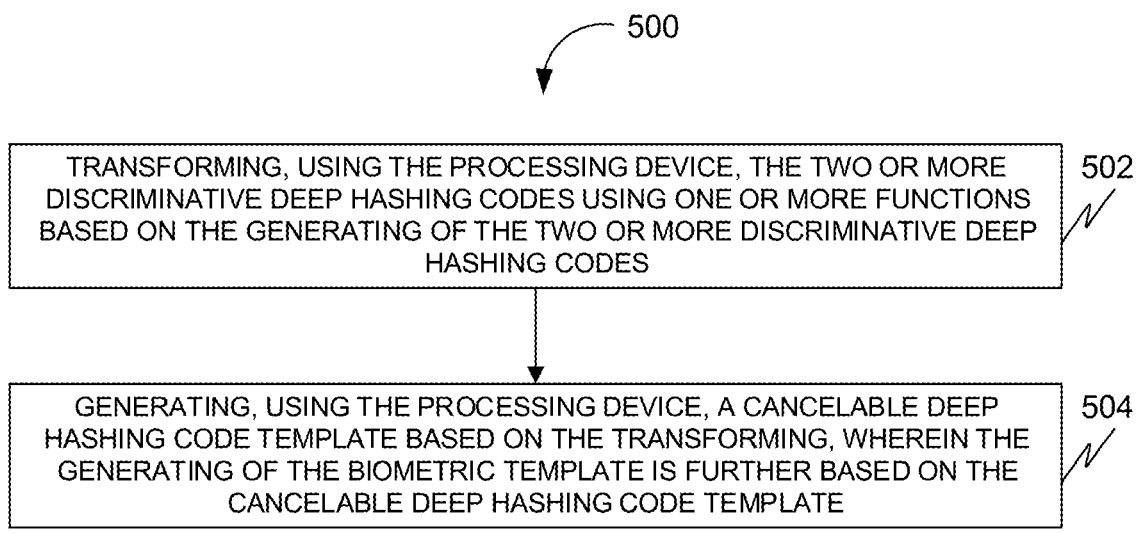

FIG. 5 illustrates a flowchart of the method for facilitating implementing biometric recognition including generating, using a processing device, a cancelable deep hashing code template based on transforming, wherein the generating of the biometric template is further based on the cancelable deep hashing code template, in accordance with some embodiments.

Figure 6:
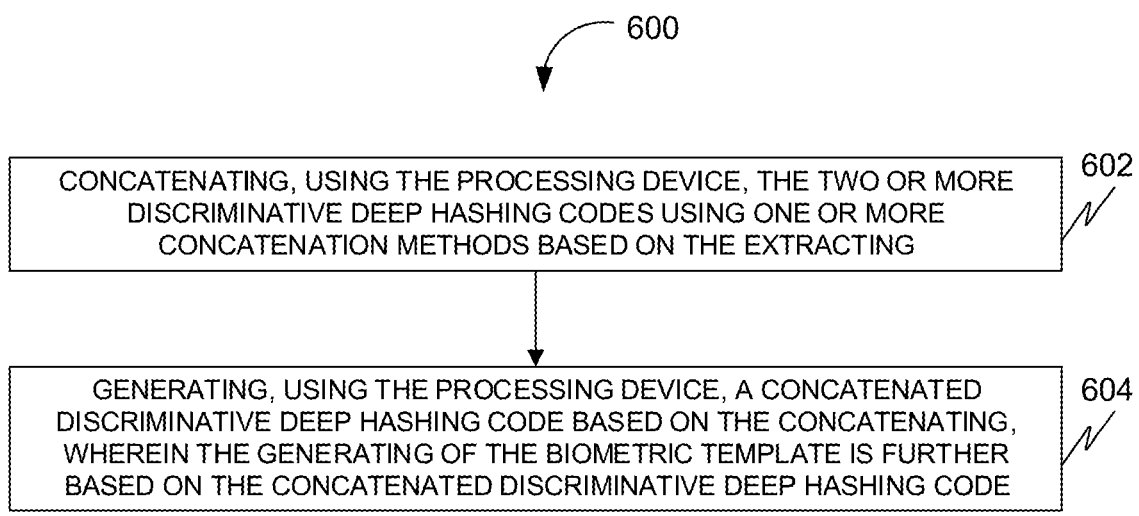

FIG. 6 illustrates a flowchart of the method for facilitating implementing biometric recognition including generating, using a processing device, a concatenated discriminative deep hashing code based on concatenating, wherein the generating of the biometric template is further based on the concatenated discriminative deep hashing code, in accordance with some embodiments.

Figure 7:
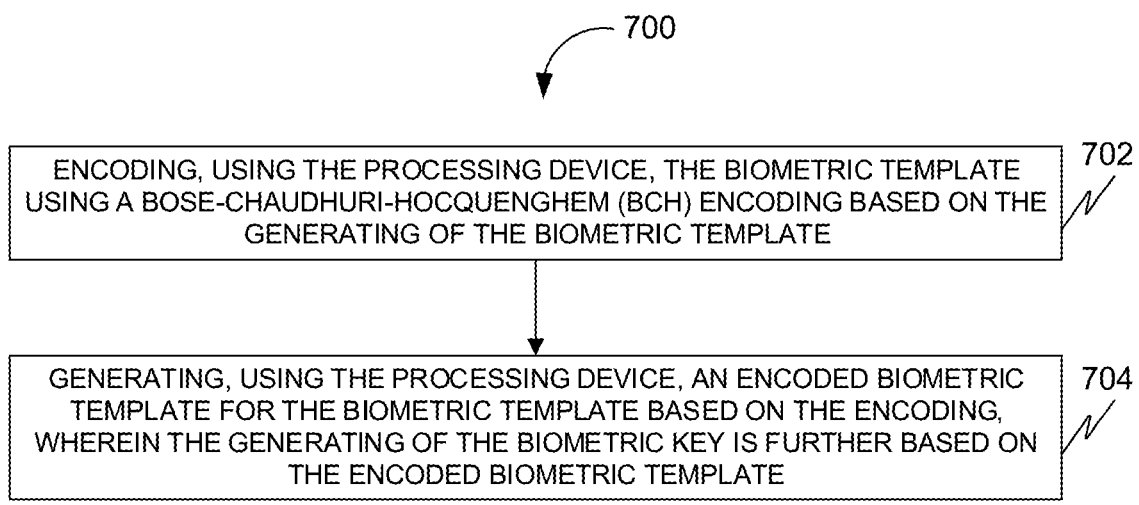

FIG. 7 illustrates a flowchart of the method for facilitating implementing biometric recognition including generating, using a processing device, an encoded a biometric template for the biometric template based on encoding, wherein the generating of the biometric key is further based on the encoded the biometric template, in accordance with some embodiments.

Figure 8:
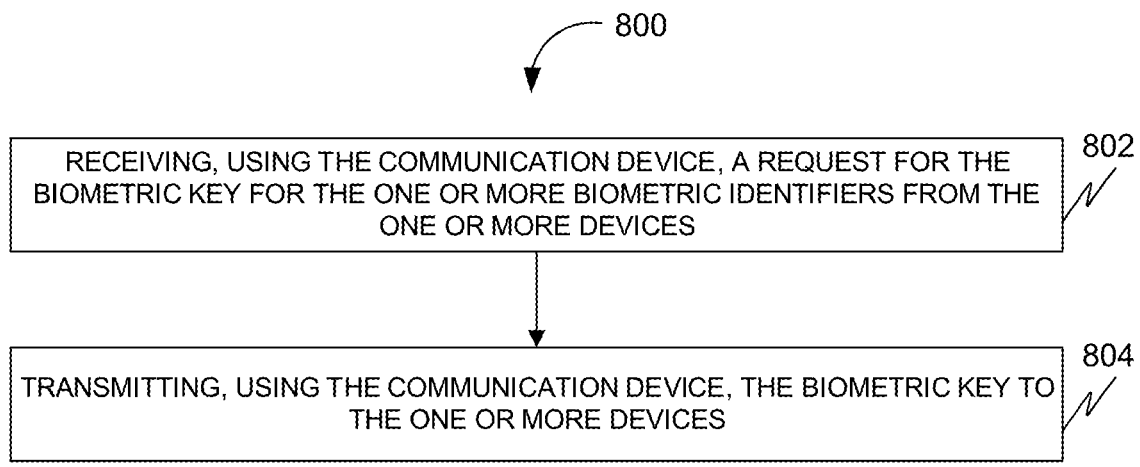

FIG. 8 illustrates a flowchart of the method for facilitating implementing biometric recognition including transmitting, using a communication device, a biometric key to the one or more devices, in accordance with some embodiments.

Figure 9:
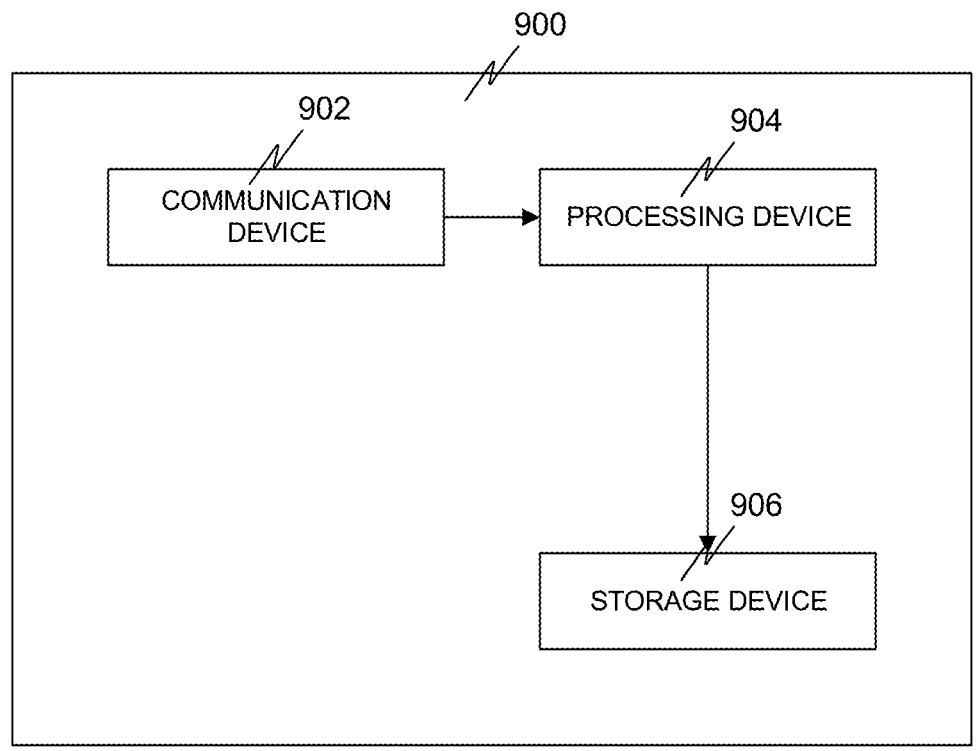

FIG. 9 illustrates a block diagram of a system for facilitating implementing biometric recognition, in accordance with some embodiments.

Figure 10:
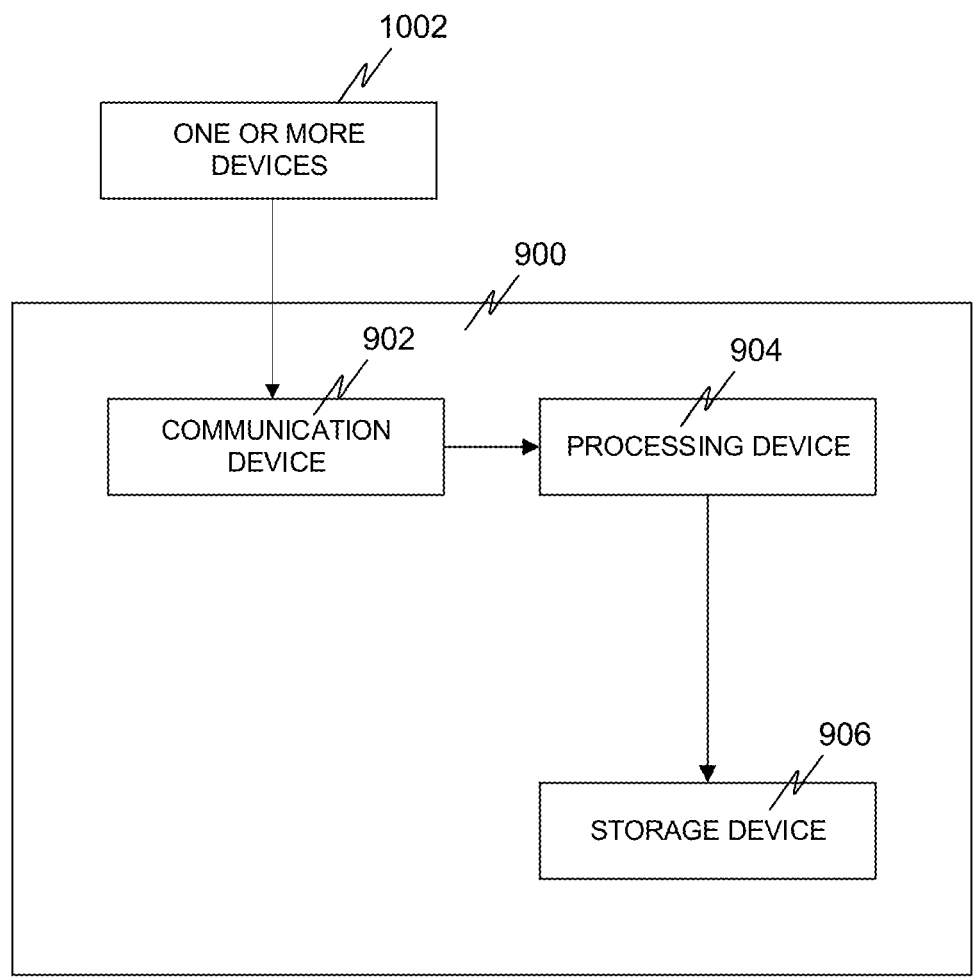

FIG. 10 illustrates a block diagram of the system for facilitating implementing biometric recognition, in accordance with some embodiments.

Figure 11:
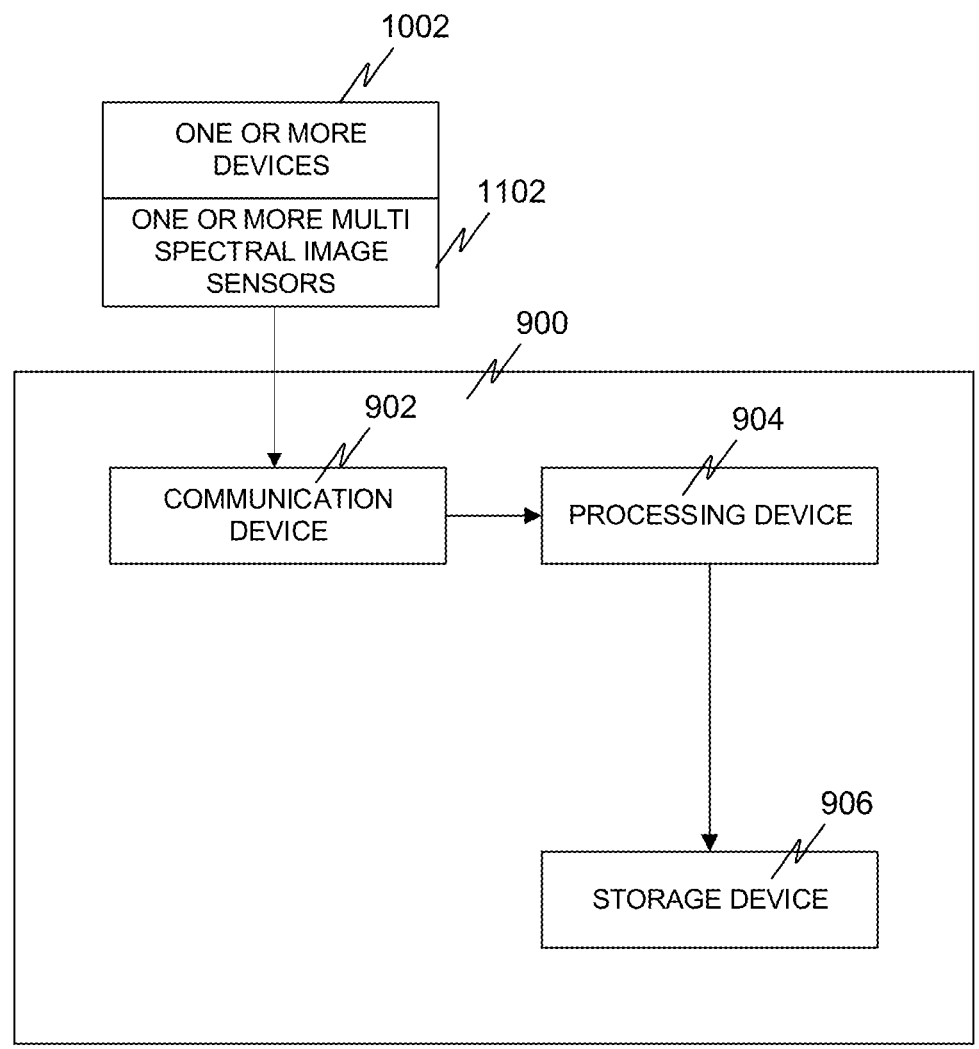

FIG. 11 illustrates a block diagram of the system for facilitating implementing biometric recognition, in accordance with some embodiments.

Figure 12:
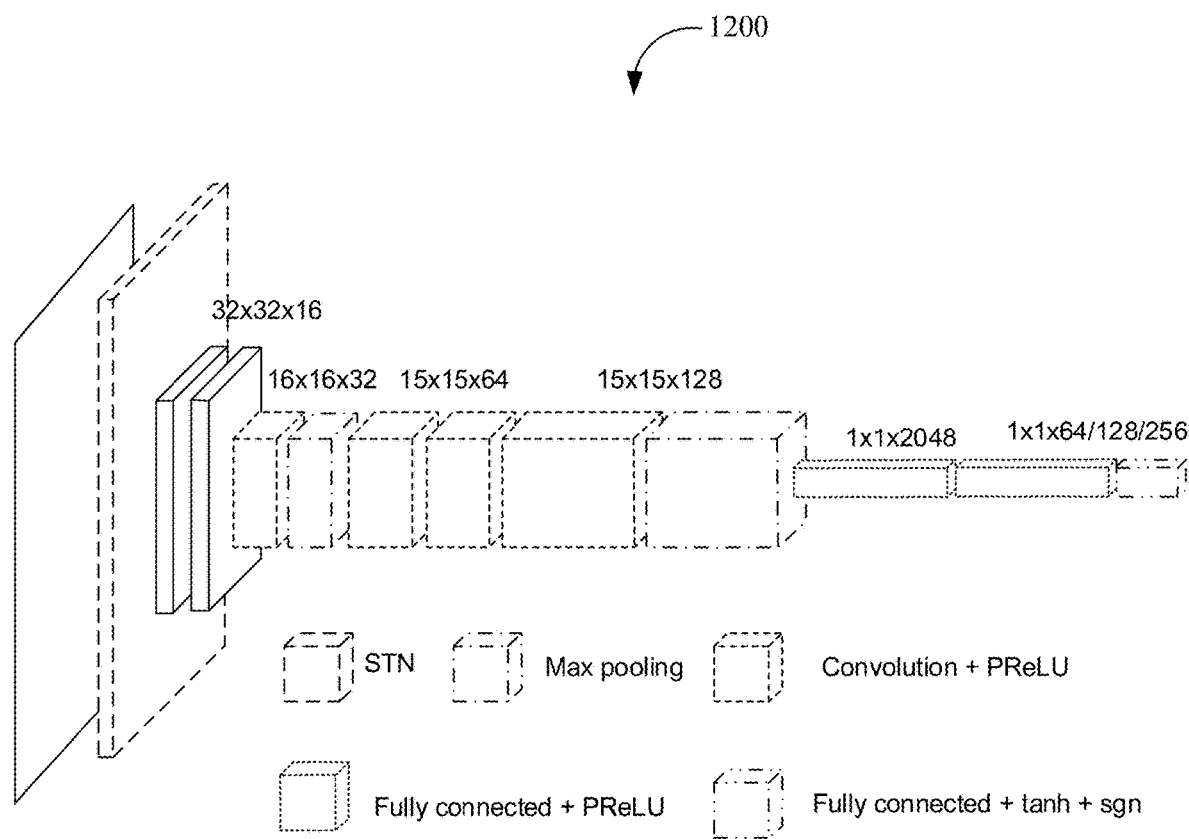

FIG. 12 illustrates an architecture of a modified CNN-F for facilitating implementing biometric recognition, in accordance with some embodiments.

FIG. 13 is a table illustrating network configurations of the modified CNN-F, in accordance with some embodiments.

Figure 14:
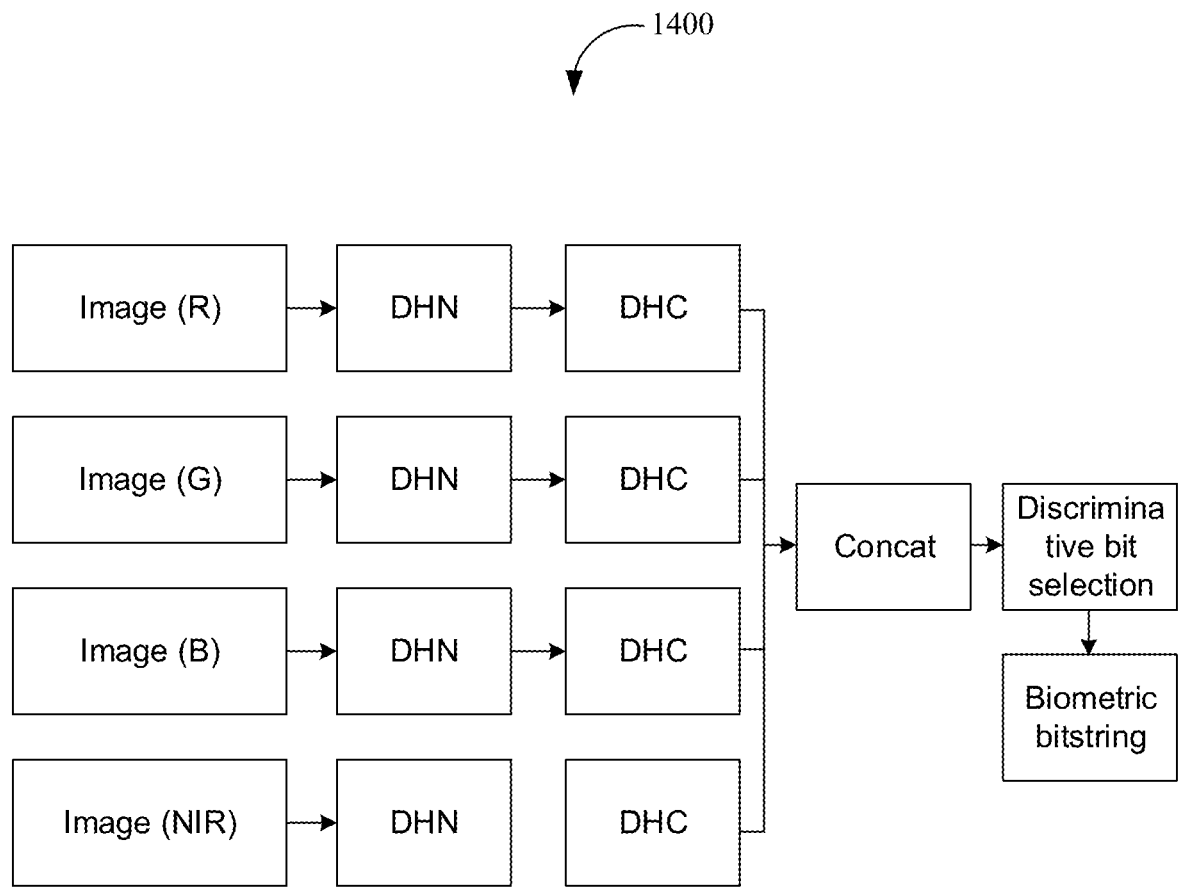

FIG. 14 illustrates a framework for selecting discriminative bits from multi-spectral concatenated templates for facilitating implementing biometric recognition, in accordance with some embodiments.

FIG. 15 is a table listing information of databases for facilitating implementing biometric recognition, in accordance with some embodiments.

Figure 16:
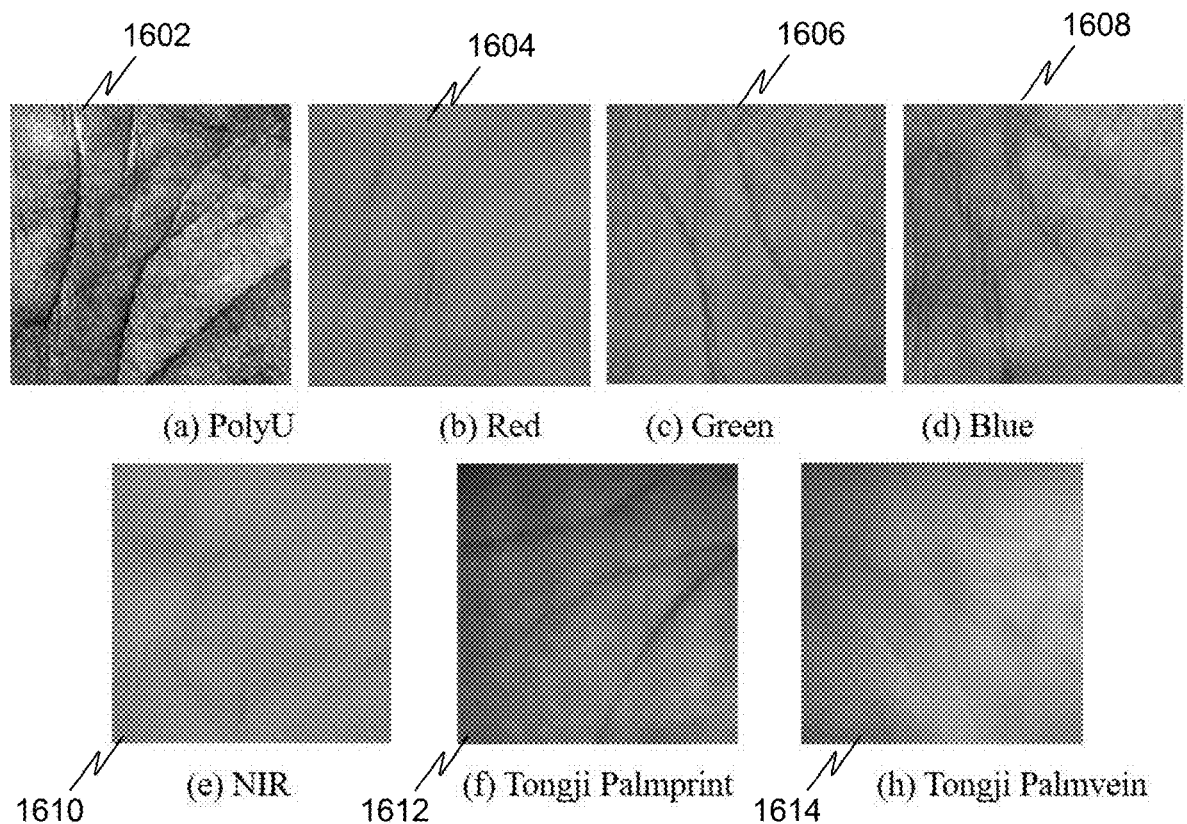

FIG. 16 illustrates image samples of palmprints for facilitating implementing biometric recognition, in accordance with some embodiments.

FIG. 17 is a table showing EERs of multi-spectral templates for facilitating implementing biometric recognition, in accordance with some embodiments.

FIG. 18 is a table showing EERs at different numbers of selected bits for facilitating implementing biometric recognition, in accordance with some embodiments.

Figure 19:
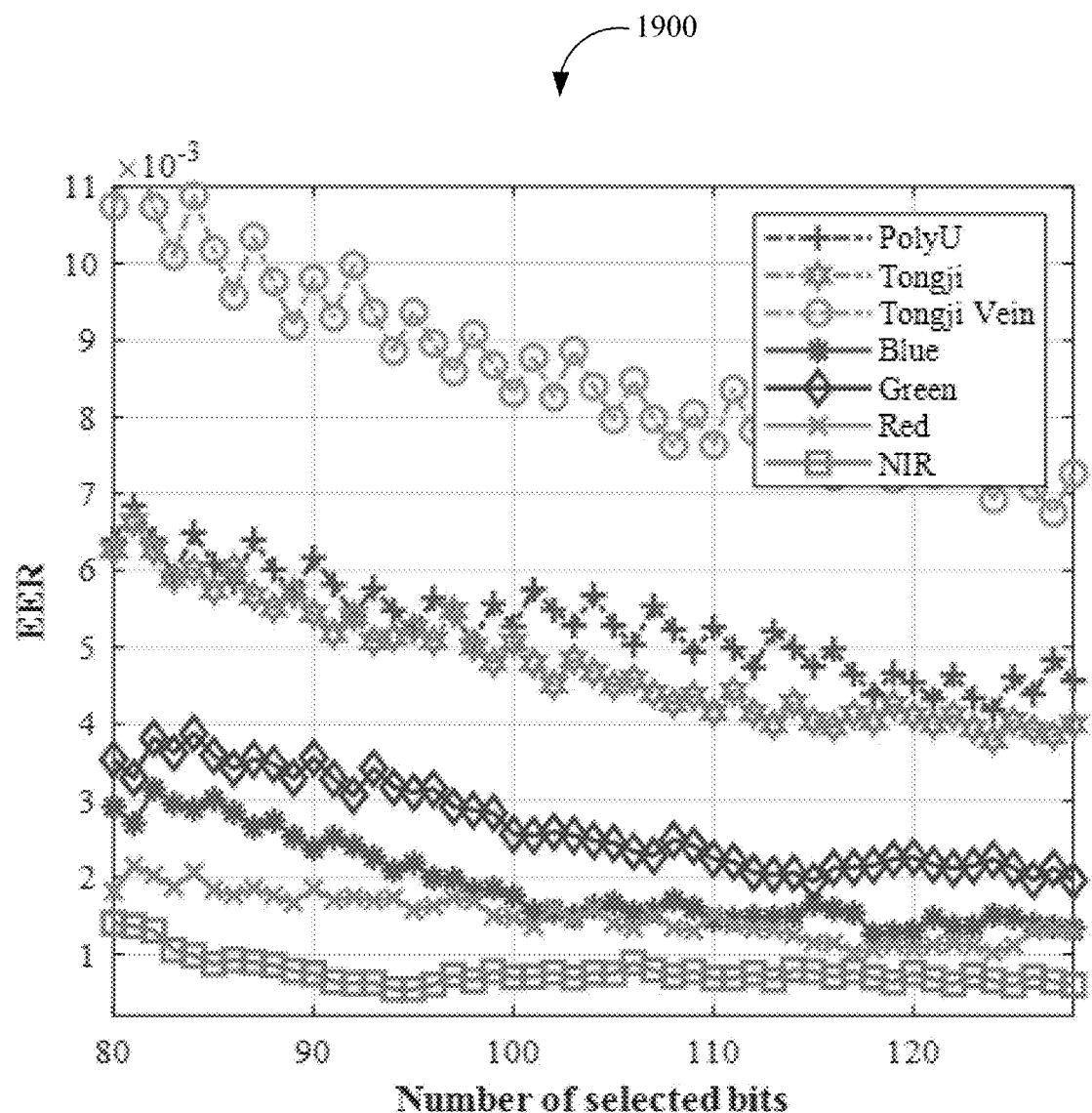

FIG. 19 is a plot showing EERs at different numbers of selected bits for facilitating implementing biometric recognition, in accordance with some embodiments.

FIG. 20 is a table showing EER percentages of the concatenated templates of multi-spectral DHCs with discriminative bit selection for facilitating implementing biometric recognition, in accordance with some embodiments.

FIG. 21 is a table showing FAR and FRR at $\tau$EER, the corresponding threshold, the number of correctable errors, and message length for facilitating implementing biometric recognition, in accordance with some embodiments.

FIG. 22 is a table showing parameter configuration of multi-spectral template concatenation for facilitating implementing biometric recognition, in accordance with some embodiments.

FIG. 23 is a table showing a performance comparison between different schemes for facilitating implementing biometric recognition, in accordance with some embodiments.

Figure 24:
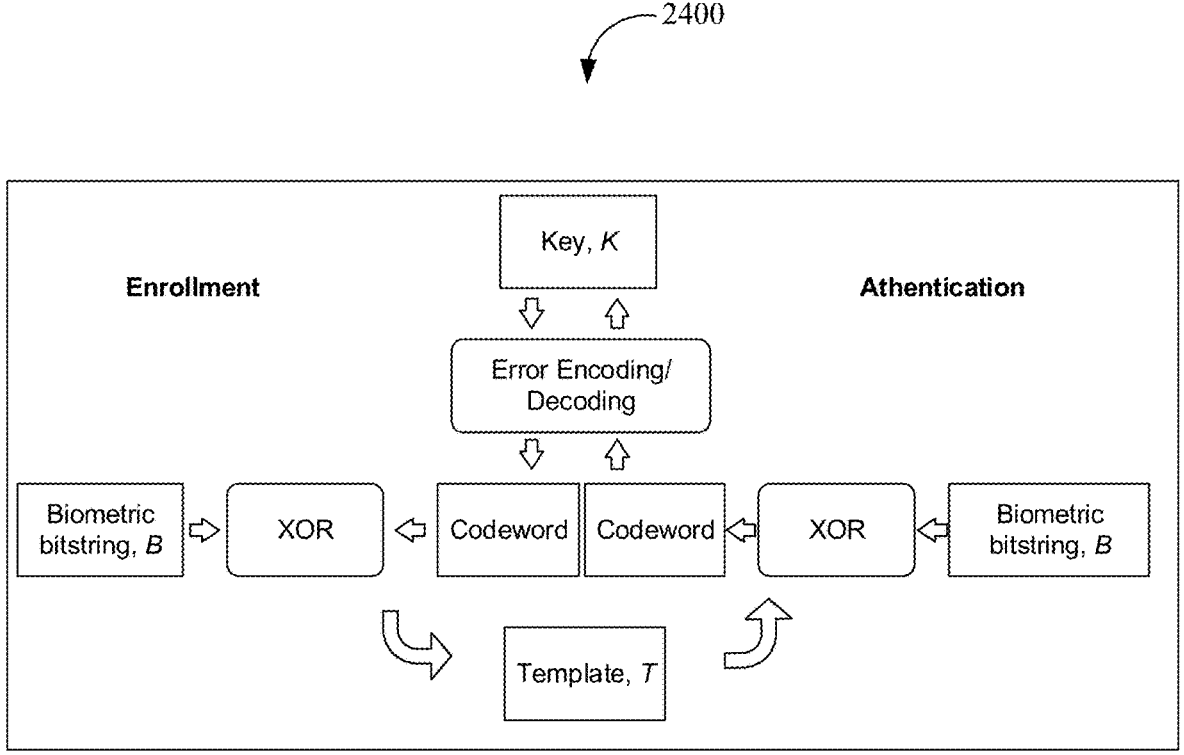

FIG. 24 is a block diagram of an algorithm facilitating implementing biometric recognition, in accordance with some embodiments.

DETAILED DESCRIPTION OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for implementing secure biometric recognition, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one device, at least one network device, at least one sensor and at least one actuator. Examples of the one or more client devices, the at least one device, and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server etc.), a quantum computer, and so on. Further, one or more client devices, one or more devices, and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an individual, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for implementing secure biometric recognition. Further, the present disclosure describes a Multi-spectral Palmprint Fuzzy Commitment Method based on Deep Hashing Code with Discriminative Bit Selection. Since the palmprint attracts increasing attention due to its several advantages in the biometrics field, a deep hashing network (DHN) is leveraged to extract discriminative deep hashing code (DHC) of palmprint. A palmprint fuzzy commitment (FC) is proposed based on DHC. The DHC has high accuracy, small size, strong robustness, and is free from shift-matching for dislocation problems, so the proposed palmprint FC can satisfactorily balance the accuracy, storage cost, and computational complexity. In addition, the DHCs of multi-spectral palmprints are concatenated and the bits are selected according to discrimination power analysis, so the accuracy is further improved.

Further, the present disclosure describes a novel palmprint cryptosystem. Further, the novel palmprint cryptosystem leverages a Deep hashing network (DHN). Further, the Deep hashing network (DHN) extracts discriminative deep hashing code (DHC) of palmprint, and then a palmprint DHC-based fuzzy commitment (FC), dubbed DHC-FC, is proposed. DHC has a small size and does not need shift matching to solve the dislocations problem, so DHC-FC has much lower storage cost and computational complexity. Further, the DHN is more robust to interference factors than classical texture coding templates, so DHC-FC has high accuracy. Further, the DHCs are not sectioned or disordered, so the accuracy in DHC-FC is not degraded, i.e., it is the same as that of DHC. Further, the bits of DHC are selected according to discrimination power analysis, so the accuracy is further improved. In addition, the storage cost and computational complexity are further reduced.

Further, the present disclosure describes palmprint recognition methods. Further, the palmprint recognition methods can be briefly divided into several classes, including geometry-based, subspace-based, statistic-based, coding-based, and deep-learning-based methods. Palmprint attracts increasing attention due to its several advantages in the biometrics field. Since palmprint is a promising and representative biometric modality, the schemes on palmprint can be conveniently extended to other biometric modalities.

Coding-based methods are free from training and have low storage costs and fast computational speed, so they are popular in practical palmprint recognition. Coding-based methods are more suitable for ideal environments, such as simple background, uniform illumination, controllable hand gesture, and location. However, practical palmprint recognition, especially contactless mode, inevitably suffers from many severe challenges. Currently, some deep-learning-based methods have been proposed by the research community for palmprint recognition, which is robust to interference and can be briefly categorized into four classes as follows:

(1) Direct usage of pre-trained networks
(2) Retraining the pre-trained networks
(3) Combination of special filters and deep learning
(4) Hashing-based network The classical CNN frameworks are suitable for classification (identification), but they are not good at verification (authentication) if they are directly used. DHN was specially proposed for verification to enlarge the inter-class variance and reduce the intra-class variance. The outputs of DHN can be represented as a bit string, so DHN can reduce the storage and accelerate matching/retrieval speed.

Chen et al. [1] proposed discriminant spectral hashing for compact palmprint representation.

Since DHC has high accuracy, small size, strong robustness, and is free from shift matching for dislocation problems, the proposed palmprint FC is based on DHC, which can satisfactorily balance the accuracy, storage cost, and computational complexity.

Further, the present disclosure describes the palmprint cryptosystem. Further, the palmprint cryptosystem is the merging of biometrics and cryptography attempts to deploy biometrics as the authenticator of cryptographic applications, in which the biometric keys can be strictly protected with a one-way function, i.e., hashing function. Cryptographic systems request that the encryption key in the enrollment stage and decryption key in the authentication stage should be exactly identical; however, due to intra-class variance, it is highly difficult to extract the identical biometric features as the key from the probe (enrolled) and query (verified) biometric templates.

To reconcile this contradiction, key binding was proposed to extract the identical encryption key and decryption key from the probe and query biometric features, respectively; whereby the biometric template and secret key are bound with some mechanisms, and then stored in a form of a concealed template. The concealed template should neither leak the secret key information nor the biometric features. Due to the error tolerance ability of key binding schemes, the secret key can be retrieved with query biometric features that are close enough to probe features.

Fuzzy Commitment (FC) [2] and Fuzzy Vault (FV) [3] are two typical frameworks of key-binding schemes. FC must be conducted on ordered binary data, such as the coded vector/matrix; while FV is suitable for unordered features, such as the set of coordinate positions of fingerprint minutiae.

Further, the palmprint cryptosystem may include palmprint FC. In [4], Wu et al. applied a hash function to protect the palmprint key that is extracted by Bose-Chaudhuri-Hocquenghem (BCH) error correction code (ECC).

FV is suitable for unordered features, such as the set of coordinate positions of minutiae. Unfortunately, the extraction of palmprint geometric features, such as minutiae, generally requires high resolution, so texture coding methods are more popular in real-time palmprint systems with low resolution. However, texture-coded templates have ordered spatial structures, if the templates are partitioned and disordered to construct the genuine points in FV, the ordered spatial structures are damaged. The size of genuine points, i.e., the fragments of the original template, are much smaller than that of the original template, so the false-match rate between a pair of genuine points is much higher than that between a pair of original templates. Thus, the accuracy performance is definitely degraded by partitioning and disordering.

Since the ordered structures of the binary templates are not destroyed in FC, the accuracy of FC can be the same as that of the original binary biometric templates. Hence, this work develops a palmprint cryptosystem based on FC. Compared with the existing palmprint cryptosystems, the proposed palmprint DHC-FC has the following advantages:

(1) Small template size, low storage cost, and computational complexity—The computational complexity in biometric cryptosystems is much higher than that in common biometric recognition systems, so practical biometric cryptosystems especially require a small template size. The template size of DHC is much lower than classical texture-coded templates, so the leverage of DHC can obviously reduce storage cost and computational complexity.

(2) Strong robust and high accuracy—The interference factors include complex background, uniform illumination, uncontrollable placement, gestures, etc. DHN is more robust to interference factors than classical texture coding templates, so the disclosed DHC-FC has high accuracy.

(3) Shift-matching-free ability—Classical texture coded templates typically need shift matching to solve the dislocation between two templates, i.e., the shift matching is performed 25 times. Therefore the authentication needs to be conducted 25 times in the biometric cryptosystems based on classical texture coded templates, which remarkably slows down the speed. The disclosed DHC-FC is free from shift matching, so it has better real-time performance.

(4) Discriminative bit selection—The bits of DHC are selected according to discrimination power analysis, so the accuracy is further improved. In addition, the storage cost and computational complexity are further reduced.

Further, the present disclosure describes palmprint DHC. Further, the palmprint DHC in this scheme is extracted by the method in [5]. Spatial transformer network (STN) [6] is used in spatial transformation and data alignment according to specific tasks. CNN-F in [7] is selected as the backbone. The architecture of the modified CNN-F is shown in FIG. 12. The network configuration is shown in FIG. 13. STN is added after the input layer, and the modified CNN-F uses 5 convolutional layers instead of 4 layers and uses the PReLU activation function after each convolutional layer. Dropout is not used in the fully connected layer. Compared with the original CNN-F, the modified CNN-F uses fewer channels and further reduces the amount of calculation. The output of DHN is two-valued, −1 and 1, the output can be converted to binary, 0 and 1. The Hamming distance can be fast computed by XOR operation on each bit.

Further, the present disclosure describes Multi-spectral template concatenation. In the multi-spectral dataset, palmprint images are acquired in four spectrums, namely red (R), green (G), blue (B), near infrared (NIR). Palm vein can be obtained from the palmprint image in the NIR spectrum. The proposed model is trained on each spectrum independently. Since the spectrums have complementary advantages, the DHCs of different spectrums are concatenated to be a complete template. For a single spectrum, the EER is about 0.2%. For double-spectrum fusion, the EER is about 0.02%. For triple-spectrum fusion, the EER is about 0.002%. For fourfold-spectrum fusion, the EER is near to the best result.

Further, the present disclosure describes Discriminative bit selection. Further, the bits of DHC are selected according to discrimination power analysis, which can further reduce the template size. Discrimination power analyses are conducted as follows. Assume the k-th template is a vector as:

$$T_k = [t_{k,1}, t_{k,2}, t_{k,3}, \ldots, t_{k,L}], k \in [1, 2, \ldots, S] \quad (1)$$

where L is the template length, S is the number of all samples. $t_{k,1}, t_{k,2}, t_{k,3}, \ldots, t_{k,L} \in \{0,1\}$. Assume M is the number of classes, N is the number of samples of each class. The inter-class variance of the i-th bit is.

$$VB_i = \frac{\sum_{a=1}^{M}(m_a - m)^2}{M} \quad (2)$$

$$m_a = \frac{\sum_{j=(a-1)\times N+1}^{a\times N} t_{j,i}}{N} \quad (3)$$

$$m = \frac{\sum_{j=1}^{M\times N} t_{j,i}}{M \times N} \quad (4)$$

The intra-class variance of the i-th bit is:

$$VW_i = \frac{\sum_{a=1}^{M}\sum_{j=(a-1)\times N+1}^{a\times N}(t_{j,i} - m_a)^2}{M \times N} \quad (5)$$

The discrimination power of the i-th bit is:

$$DP_i = \frac{VB_i}{VW_i} \quad (6)$$

The larger the discrimination power is, the higher the discrimination has. The bits of DHC are sorted in descending order according to the discrimination power and selected one by one from the sequence. The framework of discriminative bit selection for multi-spectral concatenated templates is shown in FIG. 14. The discriminative bit selection can also be conducted on the templates of the single spectrum. Four spectral templates can be concatenated, two or three spectral templates can also be concatenated. The results of the concatenations of double-, triple- and quadruple-spectral templates are compared.

Further, the present disclosure describes Error-correcting encoding. Further, BCH encoding is used for the disclosed DHC-FC. For a (n, k, t) BCH code, n, k, and t denote the codeword length, the message length, and the number of correctable errors, respectively. The DHC length of each spectrum can be 64 or 128. The threshold can be set as τEER, i.e., the distance at an equal error rate (EER) location, where the false accept rate (FAR) and false reject rate (FRR) are equal. If several spectral templates are concatenated to construct a complete template, the length of the complete template is the summation of the lengths of the concatenated spectral templates. Assume the length of the used template, the template of one spectrum or a multi-spectral concatenated template, is L. If k>L, (k–L) zeros or ones can be appended to the template to make the length of a message be k and then encode it using BCH encoding.

The FAR and FRR at τEER and the corresponding threshold, the number of correctable errors, and message length.

Further, the present disclosure describes experiments that are conducted on four public databases, which are PolyU [8], multi-spectral [8], and Tongji [9,10]. The left and right hands of one person are considered as two different classes. The samples of some classes are removed so that all classes have the same sample number. Further, the table 1500 (FIG. 15) lists the information of the databases. FIG. 16 shows the image samples 1602-1614 of these databases.

Further, the table 1700 (FIG. 17) shows the EERs of multi-spectral. The ratio between the training and testing sample numbers is 1:1. The length of DHC is set to 128 and 64 for each dataset or spectrum. All the results of multi-spectral template concatenation are better than those of single-spectral, i.e., any multi-spectral template concatenation can yield better results than that of any single spectrum. The best results appear in triple-spectral template concatenation, but the results are unstable, the results are different when different spectral templates are concatenated. Thus, it is not easy to select the spectrums for triple-spectral template concatenation. The results in quadruple-spectral template concatenation are highly close to the best results.

Further, the table 1800 shows the results of discriminative bit selection. "Original 128 bits" means that the length of the original DHC is 128. The same as "original 64 bits". The EER reaches its lowest value when some bits are selected from the original 128 bits. The bit number at the lowest EER is less than 128, and the lowest EER is lower than that of the original 128 bits. If 64 bits are selected from the original 128 bits, the EER is still lower than that of the original 64 bits. The results confirm that the discriminative bit selection produces double advantages in terms of low template size and higher accuracy.

FIG. 19 shows the EER at different numbers of selected bits. The phenomena in the table 1800 can also be observed in FIG. 19. The EER is not obviously deteriorated if a few bits are discarded by discriminative bit selection.

Further, the table 2000 shows the results of the concatenated templates of multi-spectral DHCs with discriminative bit selection. (1) Generally, the more templates are concatenated, the lower EER is. (2) Except for B+G and B+G+R, concatenated templates are more discriminative, i.e., their EERs are lower than those of single-spectral DHCs. (3) G has the worst result compared with the other three spectrums, so B+N+R reaches the best result. (4) Discriminative bit selection can help improve the accuracy while reducing the template size, which is effective for both single spectral templates and concatenated templates.

Further, the table 2100 shows the FAR and FRR at τEER, the corresponding threshold, the number of correctable errors, and message length. The discriminative bit selection produces double advantages in terms of low template size and higher accuracy, which is significant for the reduction of computational complexity in DHC-FC. Similarly, Further, the table 2200 shows the parameter configurations of multi-spectral template concatenation.

Further, the table 2300 compared the disclosed scheme with the existing methods in terms of feature representation, template size, shift matching, biometrics. The disclosed scheme has much a smaller template size, which implies the computational complexity is much lower. In addition, the disclosed scheme is free from shift matching, so the computational complexity in authentication is further reduced.

Further, the present disclosure describes a Deep hashing network (DHN) which is leveraged to extract discriminative deep hashing code (DHC) of palmprint to construct the template for a palmprint fuzzy commitment. The DHC has high accuracy, small size, strong robustness, and is free from shift matching for dislocation problems, so the proposed palmprint FC can satisfactorily balance the accuracy, storage cost, and computational complexity. In addition, discrimination power analysis can be conducted on a DHC template or the concatenated templates of multi-spectral DHCs to select the discriminative bits, so the accuracy is further improved while the template size is further reduced. In addition, a cancelable DHC template is generated to construct the template for the palmprint fuzzy commitment, which can solve the cross-database matching problem, and achieve capability of biometric template updating.

Figure 1:
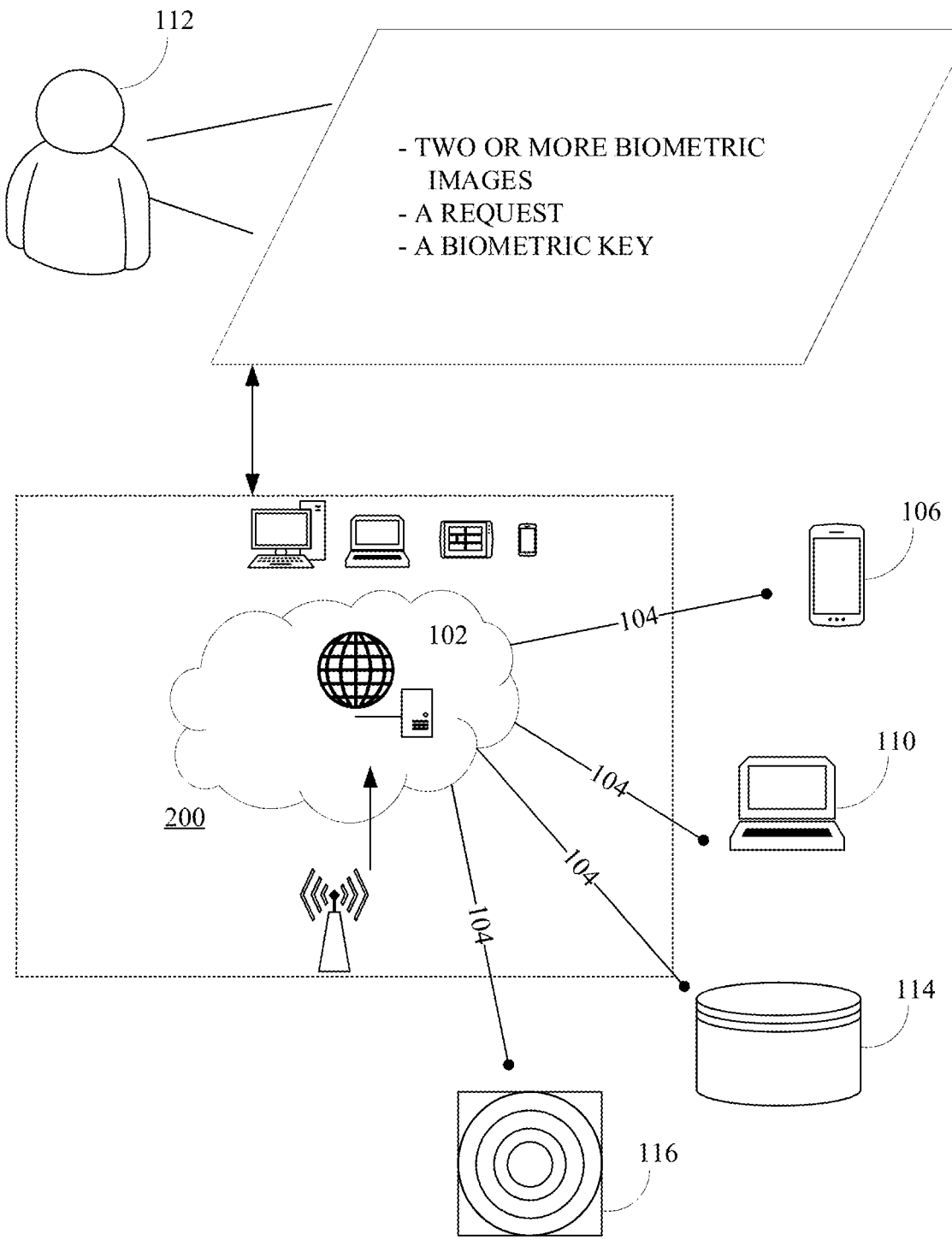
FIG. 1 is an illustration of an online platform consistent with various embodiments of the present disclosure.

FIG. 1 is an illustration of an online platform 100 consistent with various embodiments of the present disclosure. By way of non-limiting example, the online platform 100 to enable facilitating implementing biometric recognition may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, individuals, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
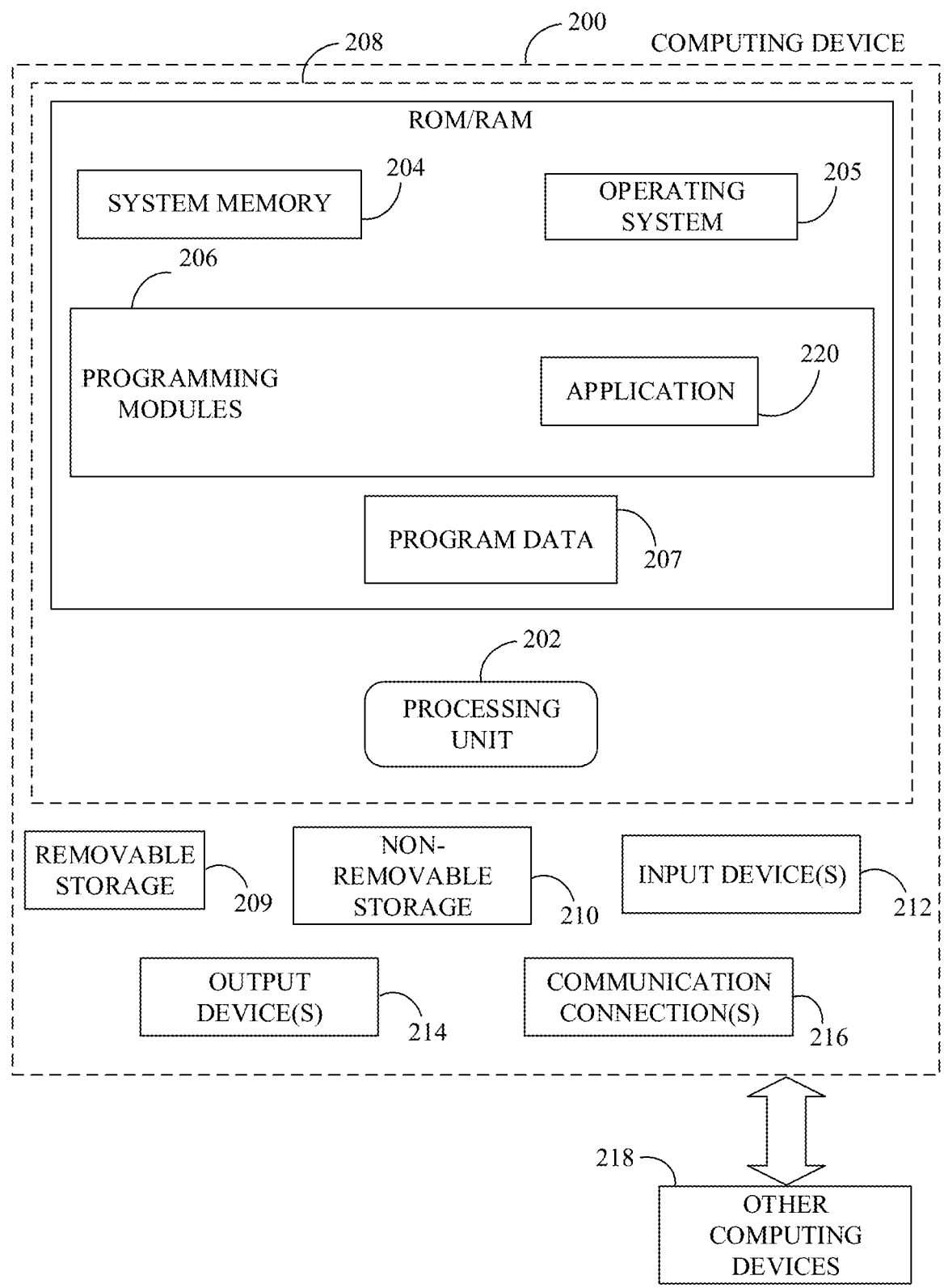
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
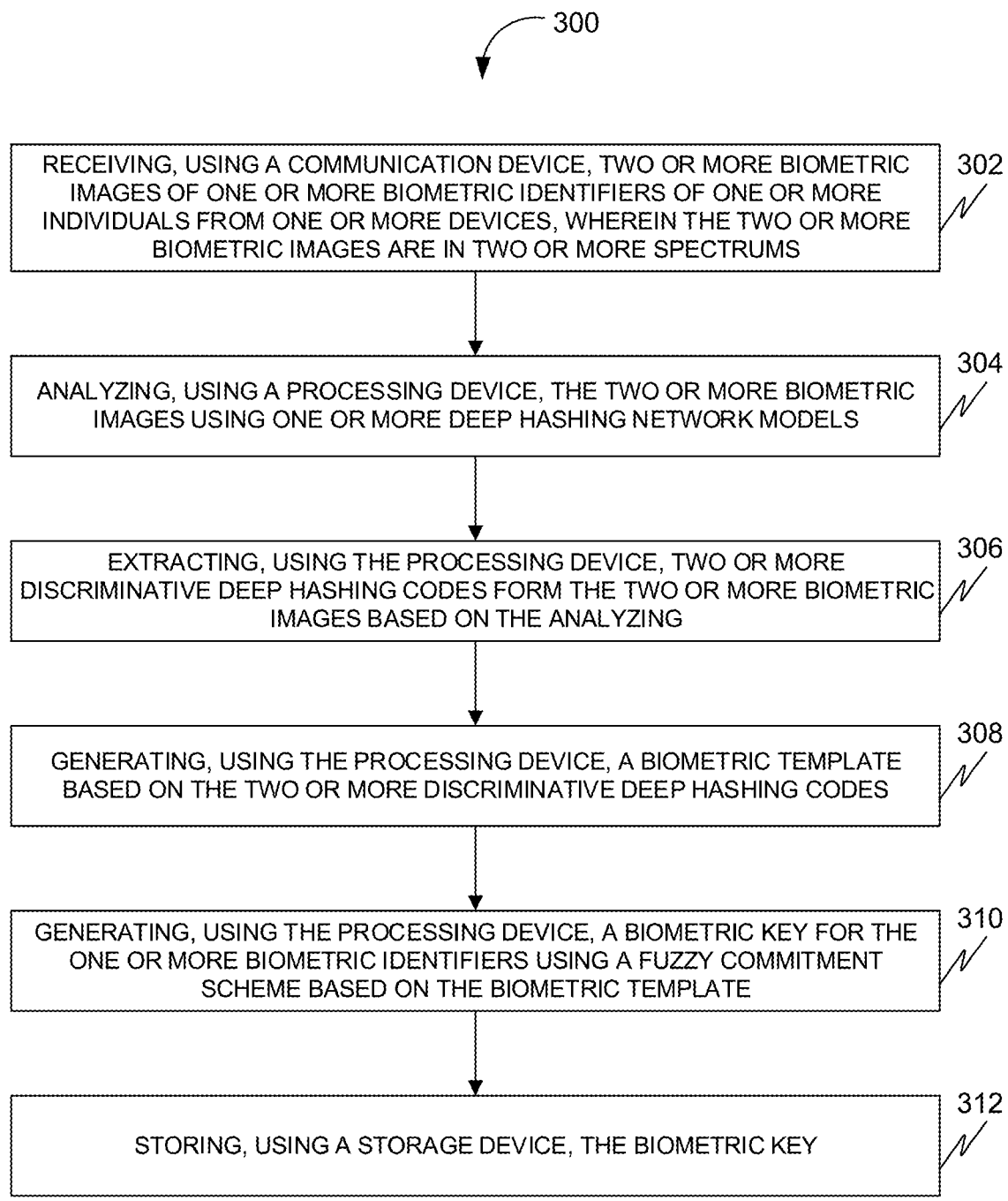
FIG. 3 illustrates a flowchart of a method for facilitating implementing biometric recognition, in accordance with some embodiments.

FIG. 3 illustrates a flowchart of a method 300 for facilitating implementing biometric recognition, in accordance with some embodiments.

Accordingly, the method 300 may include a step 302 of receiving, using a communication device (such as the communication device 902), two or more biometric images of one or more biometric identifiers of one or more individuals from one or more devices, wherein the two or more biometric images are in two or more spectrums. Further, the one or more biometric identifiers may include fingerprint, palmprint, iris print, palm veins, retina, etc. Further, the two or more spectrums may be associated with bands of the electromagnetic spectrum. Further, the method 300 may include a step 304 of analyzing, using a processing device (such as the processing device 904), the two or more biometric images using one or more deep hashing network models. Further, the method 300 may include a step 306 of extracting, using the processing device, two or more discriminative deep hashing codes from the two or more biometric images based on the analyzing. Further, the method 300 may include a step 308 of generating, using the processing device, a biometric template based on the two or more discriminative deep hashing codes. Further, the method 300 may include a step 310 of generating, using the processing device, a biometric key for the one or more biometric identifiers using a fuzzy commitment scheme based on the biometric template. Further, the method 300 may include a step 312 of storing, using a storage device (such as the storage device 906), the biometric key.

In some embodiments, the two or more biometric images may include four biometric images of the one or more biometric identifiers. Further, the four biometric images may be in four spectrums. Further, the four biometric images may include a first image in a red spectrum of the four spectrums, a second image in a green spectrum of the four spectrums, a third image in a blue spectrum of the four spectrums, and a fourth image in a near infrared spectrum of the four spectrums.

In some embodiments, the one or more biometric identifiers may include a palmprint.

FIG. 4 illustrates a flowchart of the method 400 for facilitating implementing biometric recognition including selecting, using a processing device (such as the processing device 904), a plurality of discriminative bits from the two or more discriminative deep hashing codes based on the conducting, wherein the generating of the biometric template is further based on the plurality of discriminative bits, in accordance with some embodiments.

Further, the method 400 further may include a step 402 of conducting, using the processing device, a discrimination power analysis on the two or more discriminative deep hashing codes based on the extracting. Further, the method

400 may include a step 404 of selecting, using the processing device, a plurality of discriminative bits from the two or more discriminative deep hashing codes based on the conducting, wherein the generating of the biometric template is further based on the plurality of discriminative bits.

FIG. 5 illustrates a flowchart of the method 500 for facilitating implementing biometric recognition including generating, using a processing device (such as the processing device 904), a cancelable deep hashing code template based on transforming, wherein the generating of the biometric template is further based on the cancelable deep hashing code template, in accordance with some embodiments.

Further, the method 500 further may include a step 502 of transforming, using the processing device, the two or more discriminative deep hashing codes using one or more functions based on the generating of the two or more discriminative deep hashing codes. Further, the method 500 further may include a step 504 of generating, using the processing device, a cancelable deep hashing code template based on the transforming, wherein the generating of the biometric template is further based on the cancelable deep hashing code template.

FIG. 6 illustrates a flowchart of the method 600 for facilitating implementing biometric recognition including generating, using a processing device (such as the processing device 904), a concatenated discriminative deep hashing code based on concatenating, wherein the generating of the biometric template is further based on the concatenated discriminative deep hashing code, in accordance with some embodiments.

Further, the method 600 further may include a step 602 of concatenating, using the processing device, the two or more discriminative deep hashing codes using one or more concatenation methods based on the extracting. Further, the method 600 further may include a step 604 of generating, using the processing device, a concatenated discriminative deep hashing code based on the concatenating, wherein the generating of the biometric template is further based on the concatenated discriminative deep hashing code.

In some embodiments, the one or more devices may include one or more multi spectral image sensors. Further, the one or more multi spectral image sensors may be configured for capturing the two or more biometric images in the two or more spectrums.

FIG. 7 illustrates a flowchart of the method 700 for facilitating implementing biometric recognition including generating, using a processing device (such as the processing device 904), an encoded a biometric template for the biometric template based on encoding, wherein the generating of the biometric key is further based on the encoded the biometric template, in accordance with some embodiments.

Further, the method 700 further may include a step 702 of encoding, using the processing device, the biometric template using a Bose-Chaudhuri-Hocquenghem (BCH) encoding based on the generating of the biometric template. Further, the method 700 further may include a step 704 of generating, using the processing device, an encoded biometric template for the biometric template based on the encoding, wherein the generating of the biometric key is further based on the encoded biometric template.

FIG. 8 illustrates a flowchart of the method 800 for facilitating implementing biometric recognition including transmitting, using a communication device (such as the communication device 902), a biometric key to the one or more devices, in accordance with some embodiments.

Further, the method 800 further may include a step 802 of receiving, using the communication device, a request for the biometric key for the one or more biometric identifiers from the one or more devices. Further, the method 800 further may include a step 804 of transmitting, using the communication device, the biometric key to the one or more devices.

In some embodiments, the two or more discriminative deep hashing codes may not be sectioned.

FIG. 9 illustrates a block diagram of a system 900 for facilitating implementing biometric recognition, in accordance with some embodiments.

Accordingly, the system 900 may include a communication device 902 which may be configured for receiving two or more biometric images of one or more biometric identifiers of one or more individuals from one or more devices 1002, as shown in FIG. 10. Further, the two or more biometric images may be in two or more spectrums. Further, the system 900 may include a processing device 904 communicatively coupled with the communication device 902. Further, the processing device 904 may be configured for analyzing the two or more biometric images using one or more deep hashing network models. Further, the processing device 904 may be configured for extracting two or more discriminative deep hashing codes from the two or more biometric images based on the analyzing. Further, the processing device 904 may be configured for generating a biometric template based on the two or more discriminative deep hashing codes. Further, the processing device 904 may be configured for generating a biometric key for the one or more biometric identifiers using a fuzzy commitment scheme based on the biometric template. Further, the system 900 may include a storage device 906 communicatively coupled with the processing device 904. Further, the storage device 906 may be configured for storing the biometric key.

In some embodiments, the two or more biometric images may include four biometric images of the one or more biometric identifiers. Further, the four biometric images may be in four spectrums. Further, the four biometric images may include a first image in a red spectrum of the four spectrums, a second image in a green spectrum of the four spectrums, a third image in a blue spectrum of the four spectrums, and a fourth image in a near infrared spectrum of the four spectrums.

In some embodiments, the one or more biometric identifiers may include a palmprint.

Further, in some embodiments, the processing device 904 may be configured for conducting a discrimination power analysis on the two or more discriminative deep hashing codes based on the extracting. Further, the processing device 904 may be configured for selecting two or more discriminative bits from the two or more discriminative deep hashing codes based on the conducting. Further, the generating of the biometric template may be further based on the two or more discriminative bits.

Further, in some embodiments, the processing device 904 may be configured for transforming the two or more discriminative deep hashing codes using one or more functions based on the generating of the two or more discriminative deep hashing codes. Further, the processing device 904 may be configured for generating a cancelable deep hashing code template based on the transforming. Further, the generating of the biometric template may be further based on the cancelable deep hashing code template.

Further, in some embodiments, the processing device 904 may be configured for concatenating the two or more discriminative deep hashing codes using one or more concatenation methods based on the extracting. Further, the processing device 904 may be configured for generating a concatenated discriminative deep hashing code based on the concatenating. Further, the generating of the biometric template may be further based on the concatenated discriminative deep hashing code.

In some embodiments, the one or more devices may include one or more multi spectral image sensors 1102, as shown in FIG. 11. Further, the one or more multi spectral image sensors 1102 may be configured for capturing the two or more biometric images in the two or more spectrums.

Further, in some embodiments, the processing device 904 may be configured for encoding the biometric template using a Bose-Chaudhuri-Hocquenghem (BCH) encoding based on the generating of the biometric template. Further, the processing device 904 may be configured for generating an encoded biometric template for the biometric template based on the encoding. Further, the generating of the biometric key may be further based on the encoded biometric template.

Further, in some embodiments, the communication device 902 may be configured for receiving a request for the biometric key for the one or more biometric identifiers from the one or more devices. Further, the communication device 902 may be configured for transmitting the biometric key to the one or more devices.

In some embodiments, the two or more discriminative deep hashing codes may be not sectioned.

FIG. 10 illustrates a block diagram of the system 900 for facilitating implementing biometric recognition, in accordance with some embodiments.

FIG. 11 illustrates a block diagram of the system 900 for facilitating implementing biometric recognition, in accordance with some embodiments.

FIG. 12 illustrates an architecture of a modified CNN-F 1200 for facilitating implementing biometric recognition, in accordance with some embodiments.

FIG. 13 is a table 1300 illustrating network configurations of the modified CNN-F, in accordance with some embodiments.

FIG. 14 illustrates a framework 1400 for selecting discriminative bits from multi-spectral concatenated template for facilitating implementing biometric recognition, in accordance with some embodiments.

FIG. 15 is a table 1500 listing information of databases for facilitating implementing biometric recognition, in accordance with some embodiments.

FIG. 16 illustrates image samples 1602-1614 of palmprints for facilitating implementing biometric recognition, in accordance with some embodiments.

FIG. 17 is a table 1700 showing EERs of multi-spectral templates for facilitating implementing biometric recognition, in accordance with some embodiments.

FIG. 18 is a table 1800 showing EERs at different numbers of selected bits for facilitating implementing biometric recognition, in accordance with some embodiments.

FIG. 19 is a plot 1900 showing EERs at different numbers of selected bits for facilitating implementing biometric recognition, in accordance with some embodiments.

FIG. 20 is a table 2000 showing EER percentages of the concatenated templates of multi-spectral DHCs with discriminative bit selection for facilitating implementing biometric recognition, in accordance with some embodiments.

FIG. 21 is a table 2100 showing FAR and FRR at τEER, the corresponding threshold, the number of correctable errors, and message length for facilitating implementing biometric recognition, in accordance with some embodiments.

FIG. 22 is a table 2200 showing parameter configuration of multi-spectral template concatenation for facilitating implementing biometric recognition, in accordance with some embodiments.

FIG. 23 is a table 2300 showing a performance comparison between different schemes for facilitating implementing biometric recognition, in accordance with some embodiments. Further, the table 2300 may include a palmprint cryptosystem based on FC [11]. Further, the table 2300 may include FC based on cancelable coding-based palmprint template, namely PalmPhasor code [12]. Further, the table 2300 may include a multi-biometric cryptosystem based on fingerprint and palmprint [14]. Further, the table 2300 may include cancelable palmprint cryptosystems row-co-occurrence FV [13]. Further, the table may include a hash function to protect palmprint key that is extracted by Bose-Chaudhuri-Hocquenghem (BCH) error correction code (ECC)[4].

FIG. 24 is a block diagram of an algorithm 2400 facilitating implementing biometric recognition, in accordance with some embodiments. Further, the algorithm 2400 may be used for enrollment and authentication. Further, in enrollment, a key (K) undergoes error encoding to obtain a codeword. Further, the codeword is XORed with Biometric bitstring (B), and template, T is obtained. Further, in authentication, the template is used with the Biometric bitstring which is XORed to obtain the codeword. Further, the codeword undergoes error decoding to obtain the key.

Although the present disclosure has been explained in relation to its preferred embodiment, it is to be understood that many other possible modifications and variations can be made without departing from the spirit and scope of the disclosure.

REFERENCES

[1] Y. C. Chen, M. H. Lim, P. C. Yuen, and J. H. Lai, "Discriminant spectral hashing for compact palmprint representation," in Chinese Conference on Biometric Recognition, pp. 225-232, November 2013.

[2] A. Juels, and M. Wattenberg, "A fuzzy commitment scheme," in: Proceedings of 6th ACM Conference on Computer and Communications Security, pp. 28-36, November 1999.

[3] A. Juels, and M. Sudan, "A fuzzy vault scheme," Designs, Codes and Cryptography, vol. 38, no. 2, pp. 237-257, February 2006.

[4] X. Q. Wu, D. Zhang, and K. Q. Wang, "A palmprint cryptosystem," in: Proceedings of the International Conference on Advances in Biometrics, pp. 27-29, August 2007.

[5] T. Wu, L. Leng, M. K. Khan, and F. A. Khan, "Palmprint-Palmvein Fusion Recognition Based on Deep Hashing Network," IEEE Access, vol. 9, pp. 135816-135827, September 2021.

[6] M. Jaderberg, K. Simonyan, A. Zisserman, and K. Kavukcuoglu, "Spatial transformer networks," arXiv preprint arXiv:1506.02025, Jun. 5, 2015.

[7] D. Zhong, S. Liu, W. Wang and X. Du, "Palm vein recognition with deep hashing network." in Chinese Conference on Pattern Recognition and Computer Vision (PRCV). Springer, Cham, 2018, pp. 38-49.

[8] PolyU Palmprint Database (Version 2.0). Available: comp.polyu.edu.hk/~biometrics.

[9] Tongji palmprint image database: cslinzhang.github.io/ContactlessPalm/.
[10] L. Zhang, Z. Cheng, Y. Shen, and D. Wang, "Palmprint and palmvein recognition based on DCNN and a new large-scale contactless palmvein dataset," Symmetry, vol. 10, no. 4, pp. 78, April 2018.
[11] X. Q. Wu, D. Zhang, and K. Q. Wang, "A cryptosystem based on palmprint feature," in Proceedings of the 19th International Conference on Pattern Recognition, pp. 1-4, December 2008.
[12] L. Leng, and J. S. Zhang. "Dual-key-binding cancelable palmprint cryptosystem for palmprint protection and information security." Journal of Network and Computer Applications, vol. 34, no. 6, pp. 1979-1989, November 2012.
[13] L. Leng, and A. B. J. Teoh. "Alignment-free row-co-occurrence cancelable palmprint fuzzy vault." Pattern Recognition, vol. 48, no. 7, pp. 2290-2303, July 2015.
[14] V. Sujitha, and D. Chitra. "A Novel Technique for Multi Biometric Cryptosystem Using Fuzzy Vault." Journal of medical systems, vol. 43, no. 5, pp. 1-9, May. 2019.

What is claimed is:

1. A method for facilitating implementing biometric recognition, the method comprising:
receiving, using a communication device, two or more biometric images of one or more biometric identifiers of one or more individuals from one or more devices, wherein the two or more biometric images are in two or more spectrums;
analyzing, using a processing device, the two or more biometric images using one or more deep hashing network models;
extracting, using the processing device, two or more discriminative deep hashing codes from the two or more biometric images based on the analyzing;
generating, using the processing device, a biometric template based on the two or more discriminative deep hashing codes;
generating, using the processing device, a biometric key for the one or more biometric identifiers using a fuzzy commitment scheme based on the biometric template; and
storing, using a storage device, the biometric key.

2. The method of claim 1, wherein the two or more biometric images comprises four biometric images of the one or more biometric identifiers, wherein the four biometric images are in four spectrums, wherein the four biometric images comprises a first image in a red spectrum of the four spectrums, a second image in a green spectrum of the four spectrums, a third image in a blue spectrum of the four spectrums, and a fourth image in a near infrared spectrum of the four spectrums.

3. The method of claim 1, wherein the one or more biometric identifiers comprises a palmprint.

4. The method of claim 1 further comprising:
conducting, using the processing device, a discrimination power analysis on the two or more discriminative deep hashing codes based on the extracting; and
selecting, using the processing device, a plurality of discriminative bits from the two or more discriminative deep hashing codes based on the conducting, wherein the generating of the biometric template is further based on the plurality of discriminative bits.

5. The method of claim 1 further comprising:
transforming, using the processing device, the two or more discriminative deep hashing codes using one or more functions based on the generating of the two or more discriminative deep hashing codes; and
generating, using the processing device, a cancelable deep hashing code template based on the transforming, wherein the generating of the biometric template is further based on the cancelable deep hashing code template.

6. The method of claim 1 further comprising:
concatenating, using the processing device, the two or more discriminative deep hashing codes using one or more concatenation methods based on the extracting; and
generating, using the processing device, a concatenated discriminative deep hashing code based on the concatenating, wherein the generating of the biometric template is further based on the concatenated discriminative deep hashing code.

7. The method of claim 1, wherein the one or more devices comprises one or more multi spectral image sensors, wherein the one or more multi spectral image sensors is configured for capturing the two or more biometric images in the two or more spectrums.

8. The method of claim 1 further comprising:
encoding, using the processing device, the biometric template using a Bose-Chaudhuri-Hocquenghem (BCH) encoding based on the generating of the biometric template; and
generating, using the processing device, an encoded biometric template for the biometric template based on the encoding, wherein the generating of the biometric key is further based on the encoded biometric template.

9. The method of claim 1 further comprising:
receiving, using the communication device, a request for the biometric key for the one or more biometric identifiers from the one or more devices; and
transmitting, using the communication device, the biometric key to the one or more devices.

10. The method of claim 1, wherein the two or more discriminative deep hashing codes are not sectioned.

11. A system for facilitating implementing biometric recognition, the system comprising:
a communication device configured for receiving two or more biometric images of one or more biometric identifiers of one or more individuals from one or more devices, wherein the two or more biometric images are in two or more spectrums;
a processing device communicatively coupled with the communication device, wherein the processing device is configured for:
analyzing the two or more biometric images using one or more deep hashing network models;
extracting two or more discriminative deep hashing codes from the two or more biometric images based on the analyzing;
generating a biometric template based on the two or more discriminative deep hashing codes; and
generating a biometric key for the one or more biometric identifiers using a fuzzy commitment scheme based on the biometric template; and
a storage device communicatively coupled with the processing device, wherein the storage device is configured for storing the biometric key.

12. The system of claim 11, wherein the two or more biometric images comprises four biometric images of the one or more biometric identifiers, wherein the four biometric images are in four spectrums, wherein the four biometric images comprises a first image in a red spectrum of the four spectrums, a second image in a green spectrum of the four spectrums, a third image in a blue spectrum of the four spectrums, and a fourth image in a near infrared spectrum of the four spectrums.

13. The system of claim 11, wherein the one or more biometric identifiers comprises a palmprint.

14. The system of claim 11, wherein the processing device is further configured for:
conducting a discrimination power analysis on the two or more discriminative deep hashing codes based on the extracting; and
selecting a plurality of discriminative bits from the two or more discriminative deep hashing codes based on the conducting, wherein the generating of the biometric template is further based on the plurality of discriminative bits.

15. The system of claim 11, wherein the processing device is further configured for:
transforming the two or more discriminative deep hashing codes using one or more functions based on the generating of the two or more discriminative deep hashing codes; and
generating a cancelable deep hashing code template based on the transforming, wherein the generating of the biometric template is further based on the cancelable deep hashing code template.

16. The system of claim 11, wherein the processing device is further configured for:
concatenating the two or more discriminative deep hashing codes using one or more concatenation methods based on the extracting; and
generating a concatenated discriminative deep hashing code based on the concatenating, wherein the generating of the biometric template is further based on the concatenated discriminative deep hashing code.

17. The system of claim 11, wherein the one or more devices comprises one or more multi spectral image sensors, wherein the one or more multi spectral image sensors is configured for capturing the two or more biometric images in the two or more spectrums.

18. The system of claim 11, wherein the processing device is further configured for:
encoding the biometric template using a Bose-Chaudhuri-Hocquenghem (BCH) encoding based on the generating of the biometric template; and
generating an encoded biometric template for the biometric template based on the encoding, wherein the generating of the biometric key is further based on the encoded biometric template.

19. The system of claim 11, wherein the communication device is further configured for:
receiving a request for the biometric key for the one or more biometric identifiers from the one or more devices; and
transmitting the biometric key to the one or more devices.

20. The system of claim 11, wherein the two or more discriminative deep hashing codes are not sectioned.

* * * * *